US008599906B2

(12) United States Patent
Proctor, Jr. et al.

(10) Patent No.: US 8,599,906 B2
(45) Date of Patent: Dec. 3, 2013

(54) CLOSED FORM CALCULATION OF TEMPORAL EQUALIZER WEIGHTS USED IN A REPEATER TRANSMITTER LEAKAGE CANCELLATION SYSTEM

(75) Inventors: James A. Proctor, Jr., Melbourne Beach, FL (US); Kenneth M. Gainey, Satellite Beach, FL (US); James C. Otto, West Melbourne, FL (US)

(73) Assignee: QUALCOMM Incorporated, San Diego, CA (US)

( * ) Notice: Subject to any disclaimer, the term of this patent is extended or adjusted under 35 U.S.C. 154(b) by 1127 days.

(21) Appl. No.: 12/041,603

(22) Filed: Mar. 3, 2008

(65) Prior Publication Data

US 2008/0225929 A1    Sep. 18, 2008

Related U.S. Application Data

(60) Provisional application No. 60/904,368, filed on Mar. 2, 2007.

(51) Int. Cl.
*H04B 3/36* (2006.01)

(52) U.S. Cl.
USPC ........... 375/211; 375/214; 375/212; 375/213; 375/215; 370/315; 370/310; 370/276; 370/328; 370/355; 455/7; 455/8

(58) Field of Classification Search
USPC .......... 375/211, 214, 212, 213, 215; 370/315, 370/310, 276, 328, 355, 491; 455/7, 8
See application file for complete search history.

(56) References Cited

U.S. PATENT DOCUMENTS

| | | | |
|---|---|---|---|
| 4,471,357 A | 9/1984 | Wu et al. | |
| 4,706,239 A | 11/1987 | Ito et al. | |
| 4,776,032 A | 10/1988 | Odate et al. | |
| 5,265,150 A | 11/1993 | Helmkamp et al. | |
| 5,745,523 A | 4/1998 | Dent et al. | |
| 5,802,452 A | 9/1998 | Grandfield et al. | |

(Continued)

FOREIGN PATENT DOCUMENTS

| | | |
|---|---|---|
| CN | 2465405 Y | 12/2001 |
| CN | 1658532 A | 8/2005 |

(Continued)

OTHER PUBLICATIONS

Amihai, Koo: "Design of Multiplierless FIR Digital Filters With Two to the N th Power Coefficients" IEEE Transactions on Consumer Electronics, vol. 52, No. 3, Aug. 1987, pp. 109-114, XP011158561.

(Continued)

*Primary Examiner* — Zewdu Kassa
(74) *Attorney, Agent, or Firm* — Linda G. Gunderson

(57) ABSTRACT

A repeater environment is provided to operatively deploy a feedback cancellation loop that performs closed loop calculations for weights used by a feedback equalizer to improve signal integrity and amplification. In an illustrative implementation, an exemplary repeater environment comprises a transmitter, a receiver, an equalized feedback cancellation loop circuitry operative to perform one or more closed form calculations for equalizer weights. In the illustrative implementation, the feedback cancellation loop can comprise a calculation module operative to perform one or more closed form weight calculations using linear algebraic techniques as part of feedback signal cancel operations for use by the N tap feedback equalizer canceller.

22 Claims, 14 Drawing Sheets

(56) References Cited

U.S. PATENT DOCUMENTS

| | | | |
|---|---|---|---|
| 5,819,177 A | 10/1998 | Vucetic et al. | |
| 6,141,332 A | 10/2000 | Lavean | |
| 6,151,296 A | 11/2000 | Vijayan et al. | |
| 6,163,572 A | 12/2000 | Velez et al. | |
| 6,256,506 B1 | 7/2001 | Alexander, Jr. et al. | |
| 6,339,694 B1 | 1/2002 | Komara et al. | |
| 6,445,904 B1 | 9/2002 | Lovinggood et al. | |
| 6,697,603 B1 | 2/2004 | Lovinggood et al. | |
| 6,731,904 B1 | 5/2004 | Judd | |
| 6,745,003 B1 | 6/2004 | Maca et al. | |
| 6,785,513 B1* | 8/2004 | Sivaprakasam | 455/63.1 |
| 6,889,033 B2 | 5/2005 | Bongfeldt | |
| 6,934,511 B1 | 8/2005 | Lovinggood et al. | |
| 6,990,313 B1 | 1/2006 | Yarkosky | |
| 7,027,770 B2 | 4/2006 | Judd et al. | |
| 7,035,587 B1 | 4/2006 | Yarkosky | |
| 7,068,973 B1 | 6/2006 | Lovinggood et al. | |
| 7,088,953 B2 | 8/2006 | Bongfeldt | |
| 7,130,875 B2 | 10/2006 | Abe | |
| 7,263,293 B2 | 8/2007 | Ommodt et al. | |
| 7,333,771 B2 | 2/2008 | Maxwell | |
| 7,907,513 B2 | 3/2011 | Proctor, Jr. et al. | |
| 7,907,891 B2 | 3/2011 | Proctor, Jr. et al. | |
| 7,911,985 B2 | 3/2011 | Proctor, Jr. et al. | |
| 8,116,239 B2 | 2/2012 | Proctor, Jr. et al. | |
| 8,121,535 B2 | 2/2012 | Proctor, Jr. et al. | |
| 2003/0022626 A1 | 1/2003 | Miquel et al. | |
| 2003/0124976 A1 | 7/2003 | Tamaki et al. | |
| 2004/0001464 A1 | 1/2004 | Adkins et al. | |
| 2004/0110469 A1 | 6/2004 | Judd et al. | |
| 2004/0125895 A1 | 7/2004 | Buckley et al. | |
| 2004/0147221 A1 | 7/2004 | Sheynblat et al. | |
| 2005/0068226 A1 | 3/2005 | Shinonaga et al. | |
| 2005/0190822 A1 | 9/2005 | Fujii et al. | |
| 2005/0215193 A1 | 9/2005 | Kummetz | |
| 2006/0030262 A1 | 2/2006 | Anderson et al. | |
| 2006/0077920 A1 | 4/2006 | Kilfoyle et al. | |
| 2006/0098592 A1 | 5/2006 | Proctor, Jr. et al. | |
| 2006/0109891 A1* | 5/2006 | Guo et al. | 375/147 |
| 2006/0195883 A1 | 8/2006 | Proctor, Jr. et al. | |
| 2006/0205343 A1 | 9/2006 | Runyon et al. | |
| 2006/0209931 A1 | 9/2006 | Moshavi et al. | |
| 2006/0264174 A1 | 11/2006 | Moss | |
| 2007/0041440 A1* | 2/2007 | Schoenbeck et al. | 375/235 |
| 2007/0109962 A1 | 5/2007 | Leng et al. | |
| 2008/0225931 A1 | 9/2008 | Proctor et al. | |
| 2008/0311863 A1 | 12/2008 | Nishio | |
| 2009/0239521 A1 | 9/2009 | Mohebbi | |
| 2011/0002367 A1* | 1/2011 | Kummetz | 375/211 |

FOREIGN PATENT DOCUMENTS

| | | |
|---|---|---|
| EP | 1039716 | 9/2000 |
| EP | 1324514 A2 | 7/2003 |
| EP | 1558045 A1 | 7/2005 |
| EP | 1912348 A1 | 4/2008 |
| JP | 63079429 | 4/1988 |
| JP | 1188117 | 7/1989 |
| JP | 7066775 | 3/1995 |
| JP | 8008807 A | 1/1996 |
| JP | 9036787 A | 2/1997 |
| JP | 11112402 A | 4/1999 |
| JP | 2000077926 A | 3/2000 |
| JP | 2000286772 | 10/2000 |
| JP | 2000341243 | 12/2000 |
| JP | 2001007750 | 1/2001 |
| JP | 2001223628 | 8/2001 |
| JP | 2001511960 | 8/2001 |
| JP | 2001285167 | 10/2001 |
| JP | 2001518739 | 10/2001 |
| JP | 2001309421 | 11/2001 |
| JP | 2002300094 | 10/2002 |
| JP | 2003060616 | 2/2003 |
| JP | 2003087217 | 3/2003 |
| JP | 2003511894 | 3/2003 |
| JP | 2003523690 | 8/2003 |
| JP | 2003273831 | 9/2003 |
| JP | 2004048197 A | 2/2004 |
| JP | 2004048202 | 2/2004 |
| JP | 2004328666 | 11/2004 |
| JP | 2005039336 | 2/2005 |
| JP | 2005223599 | 8/2005 |
| JP | 2005236626 | 9/2005 |
| JP | 2006020211 A | 1/2006 |
| JP | 2006506033 | 2/2006 |
| JP | 2006060498 | 3/2006 |
| KR | 20010087979 A | 9/2001 |
| KR | 20070120614 A | 12/2007 |
| KR | 2009113918 | 11/2009 |
| KR | 2009115981 | 11/2009 |
| RU | 2128886 | 4/1999 |
| RU | 2195784 C2 | 12/2002 |
| RU | 2196392 C2 | 1/2003 |
| RU | 2004135329 | 6/2005 |
| SU | 961103 A1 | 9/1982 |
| SU | 987804 A1 | 1/1983 |
| SU | 1226485 A1 | 4/1986 |
| WO | WO9410779 | 5/1994 |
| WO | WO9829962 A2 | 7/1998 |
| WO | WO9917476 | 4/1999 |
| WO | WO01026248 | 4/2001 |
| WO | 02054628 | 7/2002 |
| WO | WO03093859 A1 | 11/2003 |
| WO | WO2004045110 | 5/2004 |
| WO | WO2006011360 | 2/2006 |
| WO | WO2006094037 A2 | 9/2006 |
| WO | WO2006099209 | 9/2006 |
| WO | WO2006099525 A1 | 9/2006 |
| WO | WO2007015349 A1 | 2/2007 |

OTHER PUBLICATIONS

Chen, et al., "Transmission Filters With Multiple Flattened Passbands Based on Chirped Moire Gratings" IEEE Photonics Technology Letters, vol. 10, No. 9, Sep. 1998, XP011046212.

Juseop Lee, Saraband!: "Design of Triple-Passband Microwave Filters Using Frequency Transformations" IEEE Transactions on Microwave Theory and Techniques, vol. 56, No. 1, Jan. 2008, pp. 187-193, XP011198986.

Macchiarella, Tamiaiio: "Design techniques for dual-passband filters" IEEE Transactions on Microwave Theory and Techniques, vol. 53, No. 11, Nov. 2005, pp. 3265-3271, XP001512574.

Written Opinion—PCT/US2008/055732, International Search Authority, European Patent Office, Mar. 3, 2008.

Taiwan Search Report—TW097107407—TIPO—Jun. 12, 2012.

* cited by examiner

CLOSED FORM CALCULATION OF TEMPORAL EQUALIZER WEIGHTS USED IN A REPEATER TRANSMITTER LEAKAGE CANCELLATION SYSTEM

CLAIM OF PRIORITY

This application claims priority to U.S. Provisional Patent Application Ser. No. 60/904,368, filed on Mar. 2, 2007, entitled, "ADAPTIVE SAME FREQUENCY REPEATER TECHNIQUES," which is herein incorporated by reference in its entirety.

BACKGROUND

Conventionally, the coverage area of a wireless communication network such as, for example, a Time Division Duplex (TDD), Frequency Division Duplex (FDD) Wireless-Fidelity (Wi-Fi), Worldwide Interoperability for Microwave Access (Wi-max), Cellular, Global System for Mobile communications (GSM), Code Division Multiple Access (CDMA), or 3G based wireless network can be increased by a repeater. Exemplary repeaters include, for example, frequency translating repeaters or same frequency repeaters which operate in a physical layer or data link layer as defined by the Open Systems Interconnection Basic Reference Model (OSI Model).

Physical layer repeaters can be categorized into "same frequency" or "frequency translating" devices. The network architecture associated with where the repeater is going to be deployed will govern type of repeater used. If a same frequency repeater is used, this requires that the repeater receives and transmits on the same frequency concurrently. Accordingly, the repeater must achieve isolation between the receiver and transmitter using various antenna and digital/analog cancellation techniques. If a frequency translating repeater is used, the repeater receives a signal on a first frequency channel and then translates that to a second frequency channel for concurrent transmission. In this manner, isolation between the transmitter and receiver is achieved to a certain extent through frequency separation. Preferably, the antennas for receiving and transmitting as well as repeater circuitry are included within a same packaging in order to achieve manufacturing cost reductions, ease of installation, or the like. This is particularly the case when the repeater is intended for use by a consumer as a residential or small office based device where form factor and ease of installation is an important consideration. In such device, one antenna or set of antennas usually face, for example, a base station, access point, gateway, or another antenna or set of antennas facing a subscriber device.

For a repeater which receives and transmits concurrently, isolation between the receiving and transmitting antennas is a significant factor in overall repeater performance—this is the case whether repeating to the same frequency or repeating to a different frequency. More particularly, if the receiver and the transmitter antennas are not isolated properly, performance of the repeater can significantly deteriorate. Generally, gain of the repeater cannot be greater than the isolation to prevent repeater oscillation or initial de-sensitization. Isolation is generally achieved by physical separation, antenna patterns, or polarization. For frequency translating repeaters, additional isolation may be achieved utilizing band pass filtering, but antenna isolation generally remains a limiting factor in the repeater's performance due to unwanted noise and out of band emissions from the transmitter being received in the receiving antenna's in-band frequency range. The antenna isolation from the receiver to transmitter is an even more critical problem with repeaters operating on same frequencies and where band pass filtering does not provide additional isolation.

Often cellular based systems have limited licensed spectrum available and cannot make use of frequency translating repeating approaches and therefore use repeaters utilizing the same receive and transmit frequency channels.

As mentioned above, for a repeater intended for use with consumers, it would be preferable to manufacture the repeater to have a physically small form factor in order to achieve further cost reductions, ease of installation, and the like. However, the small form can result in antennas disposed in close proximity, thereby exasperating the isolation problem discussed above.

Current repeaters suffer an additional significant drawback in that they are not capable of separating leakage from their own transmitters from the signal they wish to repeat. As a result, conventional repeaters typically cannot optimize their system isolation and performance on real time bases resulting in poor operation or destructive effects to overall network performance. Specifically, current practices do not allow for the adaptive cancellation of unwanted signals in repeater environments while allowing the repeater to operate generally. Instead, current repeater deployments offer limited cancellation loops due to cost and complexity, are discrete implementations, and generally deployed in single band systems with no sub-band filtering. Further, current deployments of interference cancellation loops assume multipath delays and suffer from excess or unmatched delay in scattered signals, changing delays in signals (e.g., Doppler), and limited cancellation for wide band signals (e.g., ICs bandwidth).

From the foregoing, it is readily apparent that there exists a need for systems and methods to overcome the shortcomings of existing practices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The herein described systems and methods provide for a repeater environment operative to deploy a feedback cancellation loop that performs closed loop calculations for weights used by a feedback equalizer to improve signal integrity and amplification. In an illustrative implementation, an exemplary repeater environment comprises a transmitter, a receiver, an equalized feedback cancellation loop circuitry operative to perform one or more closed form calculations for equalizer weights. In the illustrative implementation, the feedback cancellation loop can comprise a calculation module operative to perform one or more closed form weight calculations as part of feedback signal cancel operations for use by the N tap feedback equalizer canceller.

In an illustrative operation, the exemplary calculation module can operate to pass to the transmitter and to a first-in-first-out (FIFO) delay line, in parallel, samples of a signal to be transmitted. The stored FIFO samples can be delayed by a selected time delay (e.g., equalizer alignment delay). Operatively, L number of samples of the desired received signal and a received transmitter leakage signal (e.g., summed at the antenna of the receiver) can be passed to a memory and stored (e.g., stored as the d vector). Samples of the FIFO delayed transmit reference signal can be passed to a memory and stored as u (1,1), u(2,1) to u(N,1), where u (k,1) can illustratively describe a matrix of N delayed versions of a L transmitted time samples, where the N delayed versions are operatively delayed versions delayed by the same amount as the delay between the taps of the N tap feedback equalizer. In the illustrative operation, a correlation matrix R can be produced from the u matrix illustratively having a dimension N×L to result in a N×N matrix. Illustratively a cross correlation vector p can be formed as a cross correlation between u and d, resulting in a Nx1 dimensioned array p. Illustratively, the exemplary calculation module can calculate the equalizer tap weights as a function of the correlation matrix and cross correlation vector, and the inverse of the matrix R, multiplied by p.

An aspect provides for a repeater for a wireless communication network, the repeater operative to provide feedback cancellation comprising: a calculation module configured to perform closed loop calculations for weights used by an equalizer, wherein samples of the transmitter and/or receiver signal are stored as part of closed loop calculations; and an equalized feedback cancellation loop comprising an equalizer cooperating with the calculation model to generate weights for use in one or more correlation operations to provide signal cancellation and isolation.

Another aspect provides for a method that facilitate feedback loop cancellation in a digital repeater environment comprising: passing samples of the signal to be transmitted to a transmitter and a first-in-first-out (FIFO) delay line in parallel; adding a selected time delay to the FIFO samples by an amount equal to the total delay from the FIFO input location through transmission processing minus an amount equal to a feedback cancellation loop's equalizer sample delay to generate FIFO delayed transmit reference signal; passing samples of the FIFO delayed transmit reference signal to a memory as a selected matrix u; generating a correlation matrix R from the stored FIFO delayed transmit reference signal samples; generating a cross correlation vector p derived from a cross correlation between the input samples d, and the stored and delayed transmitter reference signals matrix u, resulting in an array p having a selected dimension; and calculating equalizer tap weights using the inverse of R matrix and the array p.

Yet another aspect provides for a repeater for a wireless communication network, the repeater operative to provide feedback cancellation comprising: means for performing closed loop calculations for weights used by an equalizer, wherein samples of the transmitter and/or receiver signal are stored as part of closed loop calculations; and means for generating weights for use in one or more correlation operations to provide signal cancellation and isolation.

Another aspect provides for a computer readable medium having stored thereon computer executable instructions for performing the following acts: passing samples of the signal to be transmitted to a transmitter and a first-in-first-out (FIFO) delay line in parallel; adding a selected time delay to the FIFO samples by an amount equal to the total delay from the FIFO input location through transmission processing minus an amount equal to a feedback cancellation loop's equalizer sample delay to generate FIFO delayed transmit reference signal; passing samples of the FIFO delayed transmit reference signal to a memory as a selected matrix u; generating a correlation matrix R from the stored FIFO delayed transmit reference signal samples; generating a cross correlation vector p derived from a cross correlation between the input samples d, and the stored and delayed transmitter reference signals matrix u resulting in an array p having a selected dimension; and calculating equalizer tap weights using the inverse of R matrix and the array p.

Another aspect provides for a processor comprising a memory having stored thereon computer executable instructions that cause the processor to perform the following acts: passing samples of the signal to be transmitted to a transmitter and a first-in-first-out (FIFO) delay line in parallel; adding a selected time delay to the FIFO samples by an amount equal to the total delay from the FIFO input location through transmission processing minus an amount equal to a feedback cancellation loop's equalizer sample delay to generate FIFO delayed transmit reference signal; passing samples of the FIFO delayed transmit reference signal to the memory as a selected matrix u; generating a correlation matrix R from the stored FIFO delayed transmit reference signal samples; generating a cross correlation vector p derived from a cross correlation between the input samples d, and the stored and delayed transmitter reference signals matrix u, resulting in an array p having a selected dimension; and calculating equalizer tap weights using the inverse of R matrix and the array p.

Note that in all the embodiments described above, a delay in the repeater of at least the inverse of the signal bandwidth to be repeated is required to de-correlate the transmitted signal leakage, referred to as transmitter leakage signal, being received at the receiver and summed with the desired signal at the receiver's antenna from the desired signal. The MMSE calculations provided herein, rely on a correlation process to derive the feedback equalizer tap weights. This same correlation process utilizes the time alignment of the transmitter reference signal matrix u, with the transmit leakage signal, to discriminate against the desired dignal which is not time aligned and therefore will not correlates and provide influence on the values of the calculated equalized tap weights.

The following description and the annexed drawings set forth in detail certain illustrative aspects of the subject matter. These aspects are indicative, however, of but a few of the various ways in which the subject matter can be employed and the claimed subject matter is intended to include all such aspects and their equivalents.

DETAILED DESCRIPTION

Figure 1:
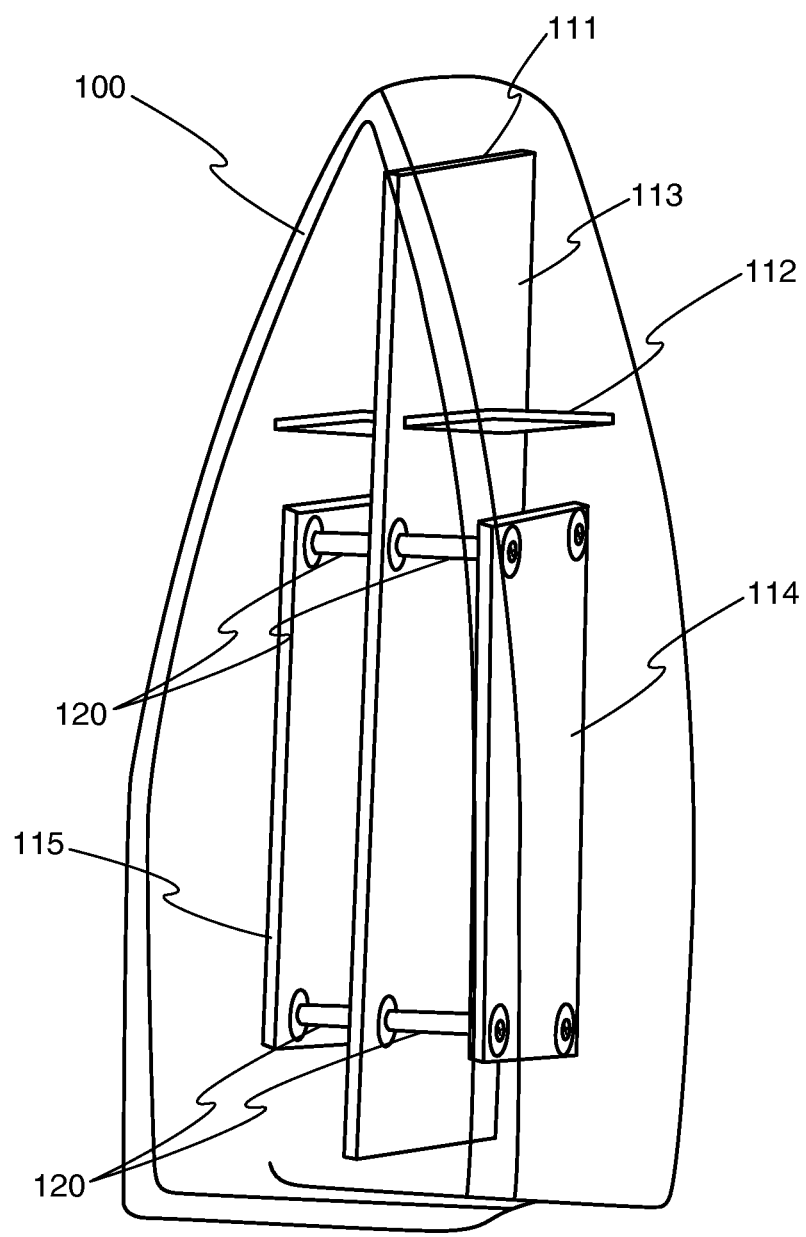
FIG. 1 is a block diagram of an exemplary enclosure of an illustrative repeater in accordance with the herein described systems and methods.

The current disclosure is related to the following U.S. patent applications filed on Mar. 3, 2008: PHYSICAL LAYER REPEATER UTILIZING REAL TIME MEASUREMENT METRICS AND ADAPTIVE ANTENNA ARRAY TO PROMOTE SIGNAL INTEGRITY AND AMPLIFICATION, Ser. No. 12/041,598; USE OF A FILTERBANK IN AN ADAPTIVE ON-CHANNEL REPEATER UTILIZING ADAPTIVE ANTENNA ARRAYS, Ser. No. 12/041,611; USE OF ADAPTIVE ANTENNA ARRAY IN CONJUNCTION WITH AN ON-CHANNEL REPEATER TO IMPROVE SIGNAL QUALITY, Ser. No. 12/041,615; AUTOMATIC GAIN CONTROL AND FILTERING TECHNIQUES FOR USE IN ON-CHANNEL REPEATER, Ser. No. 12/041,617; CONFIGURATION OF A REPEATER, Ser. No. 12/041,621; and SUPERIMPOSED COMPOSITE CHANNEL FILTER, Ser. No. 12/041,626, the contents of each of which are hereby incorporated by reference in their entirety.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiments can be practiced without these specific details. In other instances, well-known structures and devices are shown in block diagram form in order to facilitate describing one or more embodiments.

In addition, various aspects of the present invention are described below. It should be apparent that the teaching herein may be embodied in a wide variety of forms and that any specific structure and/or function disclosed herein is merely representative. Based on the teachings herein one skilled in the art should appreciate that an aspect disclosed herein may be implemented independently of any other aspects and that two or more of these aspects may be combined in various ways. For example, an apparatus may be implemented and/or a method practiced using any number of the aspects set forth herein. In addition, an apparatus may be implemented and/or a method practiced using other structure and/or functionality in addition to or other than one or more of the aspects set forth herein. As an example, many of the methods, devices, systems and apparatuses described herein are described in the context of boosting uplink pilot signals in a W-CDMA communications system. One skilled in the art should appreciate that similar techniques could apply to other communication environments.

As used in this application, the terms "component," "module," "system," and the like are intended to refer to a computer-related entity, either hardware, firmware, a combination of hardware and software, software, software in execution, firmware, middle ware, microcode, and/or any combination thereof. For example, a component can be, but is not limited to being, a process running on a processor, a processor, an object, an executable, a thread of execution, a program, and/or a computer. By way of illustration, not limitation, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complemented by additional components in order to facilitate achieving the various aspects, goals, advantages, etc., described with regard thereto, and are not limited to the precise configurations set forth in a given figure, as will be appreciated by one skilled in the art.

Furthermore, various embodiments are described herein in connection with a wireless terminal or user equipment (UE). A wireless terminal or UE can also be called a system, subscriber unit, subscriber station, mobile station, mobile, mobile device, remote station, remote terminal, UE, user terminal, terminal, wireless communication device, user agent, or user device. A wireless terminal or UE can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with wireless terminal(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. Additionally it should be appreciated that a carrier wave can be employed to carry computer-readable electronic data or instructions such as those used in transmitting and receiving voice mail, in accessing a network such as a cellular network, or in instructing a device to perform a specified function. Accordingly, the term "machine-readable medium" refers to various physical media capable of storing, containing, and/or carrying instruction(s) and/or data (but does not refer to vacuum). Additionally, the herein described systems and methods can be deployed as machine readable medium as part of wireless channels capable of storing, containing, and/or carrying instructions and/or data. Of course, those skilled in the art will recognize many modifications may be made to the disclosed embodiments without departing from the scope or spirit of the invention as described and claimed herein.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA), TD-SCDMA, and TD-CDMA. cdma2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the above techniques may be described below in the context of uplink pilot multiplexing as it applies to LTE, and as a result, 3GPP terminology may be used in much of the descriptions below, where appropriate.

Closed Form Calculation of Equalizer Weights
Overview

A related application describes inventive adaptive approaches to derive currently deployed metrics (e.g., correlation metric). In some embodiments, a statistical gradient or steepest decent algorithm converges to a minimum metric or error level. These adaptive approaches may have several drawbacks. One disadvantage is that they can be slow to converge. Speed of convergence is affected by a gain often referred to as alpha in the LMS algorithm or "step gain." The larger the value of alpha, the faster the convergence of adaptation will occur, at the expense of "jitter" in a final converged solution and with loss of stability of the system. This loss of stability is the second major disadvantage. In some cases, where gain of the adaptation loop is above a considered threshold, the adaptive algorithm may not converge to a desired level at any point in processing. Further, a stability value one sets for alpha or "step gain" is dependent on the system on which the adaptive algorithm is deployed, and may vary over time. As a result, a conservative value is often employed, resulting in a slower convergence rate of the algorithm.

In a digital implementation of an exemplary repeater, where input is digitized, processing occurs in base band, and output of the repeater is available in a digital representation, leakage cancellation is ideally performed within the digital processing. In particular, an equalizer weight calculation performed within the feedback canceller may be numerically calculated in a closed form solution using linear algebraic techniques.

Such techniques have been applied to receiver systems such as Multi-Input/Multi-Output (MIMO) multi-stream receivers, digital beam forming antenna receiver systems, and temporal equalizers for the reduction of undesired distortion such as inter symbol interference in receiver systems.

Important elements facilitating approaches to be used in these systems typically involves having knowledge of training sequences or known portions of the desired received signals embedded within the overall receive-signals (the received signals including transmitter leakage as well) at the receiver. These known training sequences are generally represented in various forms (e.g., the form of a preamble for IEEE802.11n, or as a pilot sub-carrier in OFDM systems). For CDMA systems these sequences are generally transmitted on the pilot code channel as separated from the other channels by orthogonal codes. In the case of the 1xEV-DO standard the known information is the pilot symbols, and are separated and distinguished from other signals by both code and by a time division multiplexing of information bits and known pilot bits.

The herein described systems and methods provide a digital repeater system in which the time delay of the repeater is such that a new signal and the transmitted repeated signal can be delayed by longer periods in time relative to each other. In an illustrative implementation, the receiver can use both the desired new signal, and the re-transmitted repeater signal. This repeated signal can be delayed sufficiently that, on average, the desired receiver signal and the leakage from the transmitter are no longer strongly correlated. Since the transmitted signal can be provided to an exemplary D/A converter in a digital format prior to transmission, it may be delayed as well in base band to time align the samples with the reception of the transmitter leakage. The delay imposed at base band can operatively compensate for any additional delay due to the additional base band processing, digital to analog converter delay, Analog/RF filtering delay, propagation delay, reception processing delay, analog to digital converter delay, and any other digital processing required prior to the base band cancellation block. Illustratively, this described delay can allow for the time alignment of the leakage signal and the stored/delayed transmitter signal. Since they are time aligned they will correlate strongly, while the desired receive signal will not correlate strongly. Such relationship can be utilized in a new way to provide for an MMSE closed form solution for a canceller.

In the illustrative implementation, an exemplary digital repeater system utilizing a "correlation metric" can utilize the transmit signal itself as the "known" signal or training sequence for the MMSE . Note that a temporal equalizer in a receiver and/or a beam-forming "spatial equalizer" in a receiver can be used to improve cancellation of transmitter leakage. According to embodiments herein, a training sequence can be used with a receiver to provide for an equalized signal that matches as closely as possible the desired training sequence. Since the transmitted signal and the new (time delayed) receive signal are on average uncorrelated, these signals may be utilized in a closed form solution for the temporal equalizer coefficients utilized in the leakage canceller.

In some embodiments, the minimum mean squared error (MMSE) calculation steps require a correlation between the already established known training sequence and the signal to be filtered, during the calculation of the equalizer tap weights. Illustratively, in a receiver utilizing an equalizer, delayed versions of receive signal (u) are correlated against the known "training sequence" (d). Illustratively, a cross correlation matrix (R) can be formed between the delayed versions of the signal themselves (u). An exemplary equalizer can operatively drive the output of the filter utilizing a weight vector (Wc) to be similar to the training sequence during a training period where the training sequence is known to be present in the received signal, and these weights values will be held constant for periods of time when the training sequence is not present (that is, the weight values represented by the weight vector Wc need not be varied outside the training period). The result is a similar improvement to the receiver data signals, as was achieved during the training period.

The weight vector Wc minimum mean squared error (MMSE) solution can be calculated as Wc=$R^{-1}$p where the multiplication can illustratively comprise a matrix operation of a N×N array times a N×1 vector, resulting in a N×1 Wc vector, where there are N equalizer weights, or in the case of a spatial array N beam forming receivers.

The result of the MMSE solution is to minimize mean squared error between the training sequence and equalized signal containing the training sequence. As mentioned above, during periods of time where no training sequence is present, last known equalizer weights can be held constant and utilized in the equalizer for benefit of the desired signal.

In the illustrative implementation, the "well known" approach can be utilized in a different manner. By way of example, the "known training sequence" can operatively be present as it is the signal that is actively being transmitted, and stored in a delay line as described above. The stored transmit signal can be illustratively referred to as the "Transmitter Reference Signal." The equalizer can operate such that the input signal is not matched to the training sequence. The exemplary equalizer can operate to condition the known training sequence (e.g., the stored transmitter signal) to render it as similar to the received transmitter leakage signal coming into the canceller as possible. Thus, rather than correlating delayed versions of the receiver signal with the known "Transmitter Reference signal," delayed versions of the known "Transmitter Reference Signal" can be correlated with the input to the canceller (e.g., the sum of the received transmitter leakage signal and the desired signal). Illustratively, in the example provided, the delayed "Transmitter Reference Signal" can be represented by u(t), where previously the receive signal was represented in this manner. Further, the received desired signal summed with the transmitter leakage signal can be labeled d(t) to reflect that the equalized "Transmitter Reference Signal" will be matched to the correlated portion of the received signal (i.e. the received transmitter leakage signal). Previously, the training sequence was labeled d(t) for the applications to wireless systems common in the art.

Since the desired signal is at a sufficiently larger delay than the transmitter leakage signal, the desired signal may not correlate with the transmitter reference signal. Illustratively what can result is a processing gain and improvement in the signal to noise ratio (SNR) of the correlation between the transmitter leakage signal and the delayed versions of the "Transmitter Reference Signal." In fact, the SNR may be further improved by correlating over longer and longer time periods. Utilizing the exemplary time offset approach, weights for the exemplary equalizer can be continuously adapted, while active cancellation can occur, eliminating the need for training periods and operation periods.

The MMSE approach can provide a weight vector applied for a finite impulse response filter that can direct the control of the output filter to match the transmitter leakage signal present in the received signal when processing the Transmitter Reference Signal. Output of this FIR filter (the cancellation signal) can be subtracted from the input to the canceller block, thus reducing remaining transmitter leakage signal significantly.

In the most simple calculation of the feedback weights, a single delay of the Transmitter Reference signal can be used. By way of example, u(t) can be correlated with the d(t) over L time samples. Stated differently, the canceller input signal can be correlated with the "Transmitter Reference Signal" over L number of samples. The resulting product can then divided by autocorrelation of the transmitter reference signal.

Illustratively, a single feedback weight can be calculated as (Tx*conj(Rx))/(Tx*TxH). Operatively, the result of the calculation can be 1×1 or a single complex scalar, which when multiplied by the Tx time series will align the gain and phase to the "Transmitter Leakage" contained in the receive signal. For very narrow band signals, a single feedback tap equalizer can be sufficient for cancellation over a narrow bandwidth.

In sum, according to some embodiments, a certain delay in the repeater is utilized to de-correlate the desired signal being received by the repeater from the repeater transmitter signal concurrently leaking back into the repeater's receiver. This property may be exploited to allow the received transmitter leakage signal to be utilized as a training sequence, even in the presence of a desired receive signal. While no predefined training sequence is utilized as with standard practices using similar mathematics, the received signal (including both desired signal and undesired transmitter leakage signal) provides for this function enabling use of a closed form calculation, rather then traditional adaptive techniques, to determine weights for a temporal equalizer. Correlation of an input signal with more than one sample of the transmitter leakage signal may provide more effective equalizer weights in a shorter time than adaptive equalizer weight determination using a single correlation per input signal sample. The techniques herein may be used exclusively during a training period (in which a desired new signal to be repeated is either not received or not repeated), may be used in normal operation of the repeater (i.e., in conjunction with receiving and repeating a desired new signal), or both.

Exemplary Repeater:

FIG. 1 illustrates an exemplary enclosure for an illustrative repeater in accordance with various aspects described herein. A dipole dual patch antenna configuration along with repeater electronics can be efficiently housed in a compact enclosure 100 as shown in FIG. 1. The structure of the enclosure 100 can be such that it can be intuitively oriented in at least one of two ways; however, instructions can guide a user in connection with placement of the enclosure to maximize signal reception. In the exemplary dipole dual patch antenna configuration, a ground plane 113, incorporated with a printed circuit board (PCB) for the repeater electronics can be arranged between and parallel to two patch antennas 114 and 115 using, for example, standoffs 120. An isolation fence 112 can be employed to improve isolation in many instances.

Each of the patch antennas 114 and 115 can be arranged, for example, parallel to the ground plane 113 and can be printed on wiring board or the like, can be constructed of a stamped metal portion embedded in a plastic housing, or fabricated differently. A planar portion of the PCB associated with the ground plane 113 can contain a dipole antenna 111 configured, for example, as an embedded trace on the PCB. Typically, the patch antennas 114 and 115 are vertically polarized and the dipole antenna 111 is horizontally polarized, although other embodiments may be used.

A combination of non-overlapping antenna patterns and opposite polarizations can be utilized to achieve approximately 40 dB of isolation between the receiving and transmitting antennas in a dual dipole dual patch antenna. Particularly, one of the transmitter and the receiver uses one of two dual switched patch antennas having vertical polarization for communication with an access point, while the other of the of the transmitter and the receiver employs the dipole antenna having horizontal polarization. This approach would be particularly applicable when the repeater is meant to repeat an indoor network signals to indoor clients. In this case, the pattern of the antennas transmitting to the clients would typically need to be generally omni-directional, requiring use of the dual dipole antennas, as direction to the clients is unknown.

Figure 2:
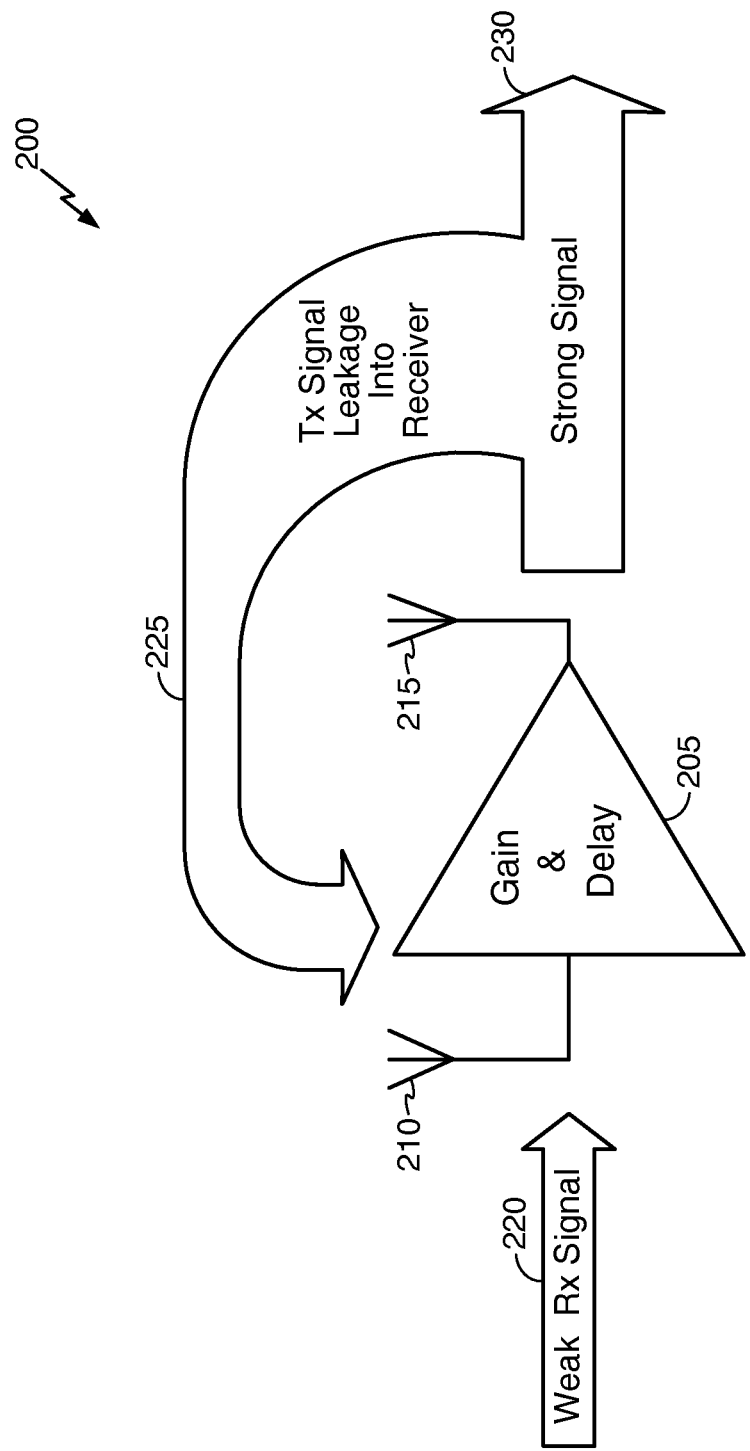
FIG. 2 is a block diagram of exemplary signal propagation for an exemplary RF repeater performing feedback cancellation in accordance with the herein described systems and methods.

FIG. 2 depicts an illustrative block diagram of an exemplary signal flow within illustrative repeater environment 200. As shown, a weak received signal (which may ber referred to as the "desired new signal") 220 can be received by antenna element 210, and act as input to gain and delay component 205. Gain and delay component 205 can process the weak received signal 220 to produce strong signal 230 as an output from antenna element 215. Further, a transmit signal leakage into receiver 225 can also act as input to gain and delay 205 at antenna element 210 for use when processing the weak received signal 220 to generate strong signal 230. The transmit leakage signal into the receiver 225 can be generated by a feedback cancellation loop (not shown) operatively coupled to the antenna elements 210 and 215. That is, the feedback cancellation loop generates a signal to be transmitted by the repeater, some of which is received by receiver 225 as a transmit leakage signal.

Figure 3:
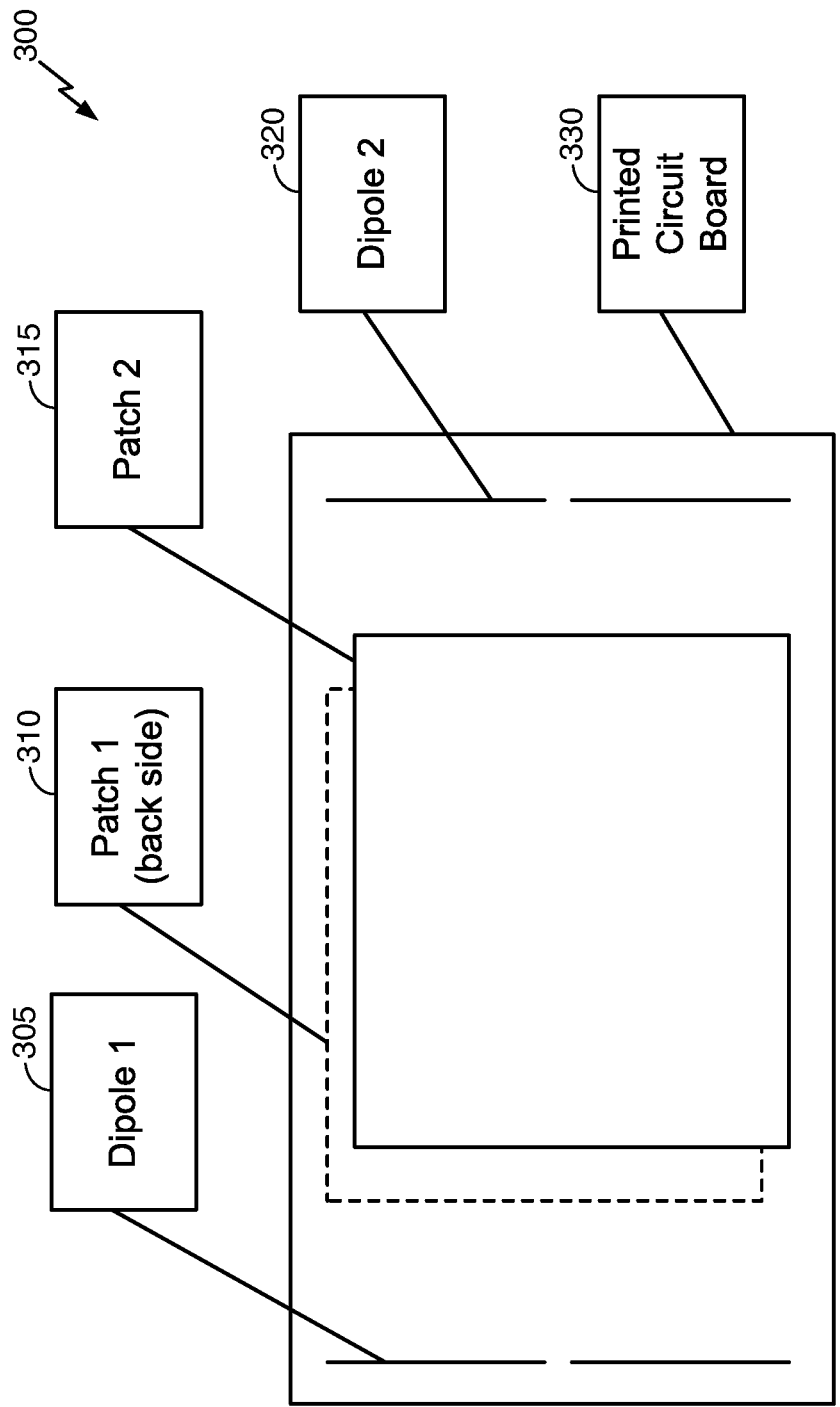
FIG. 3 is a block diagram of exemplary antenna repeater components in accordance with the herein described systems and methods.

FIG. 3 illustrates interaction of antenna elements of an exemplary repeater environment 300. Exemplary repeater environment 300 comprises printed circuit board 330 which includes dipole antennas 305 and 320, and further includes patch antennas 310 and 315. In an illustrative implementation, the dipole/patch antenna combination can achieve selected isolation between transmit and receive channels to allow for implementation of desired feedback cancellation. The antenna configuration of FIG. 3 is an example of a configuration of the antenna arrays that may be used in other embodiments described herein (where, e.g., patch antenna 310 is part of one antenna array and patch antenna 315 is part of the other antenna array).

Figure 4:
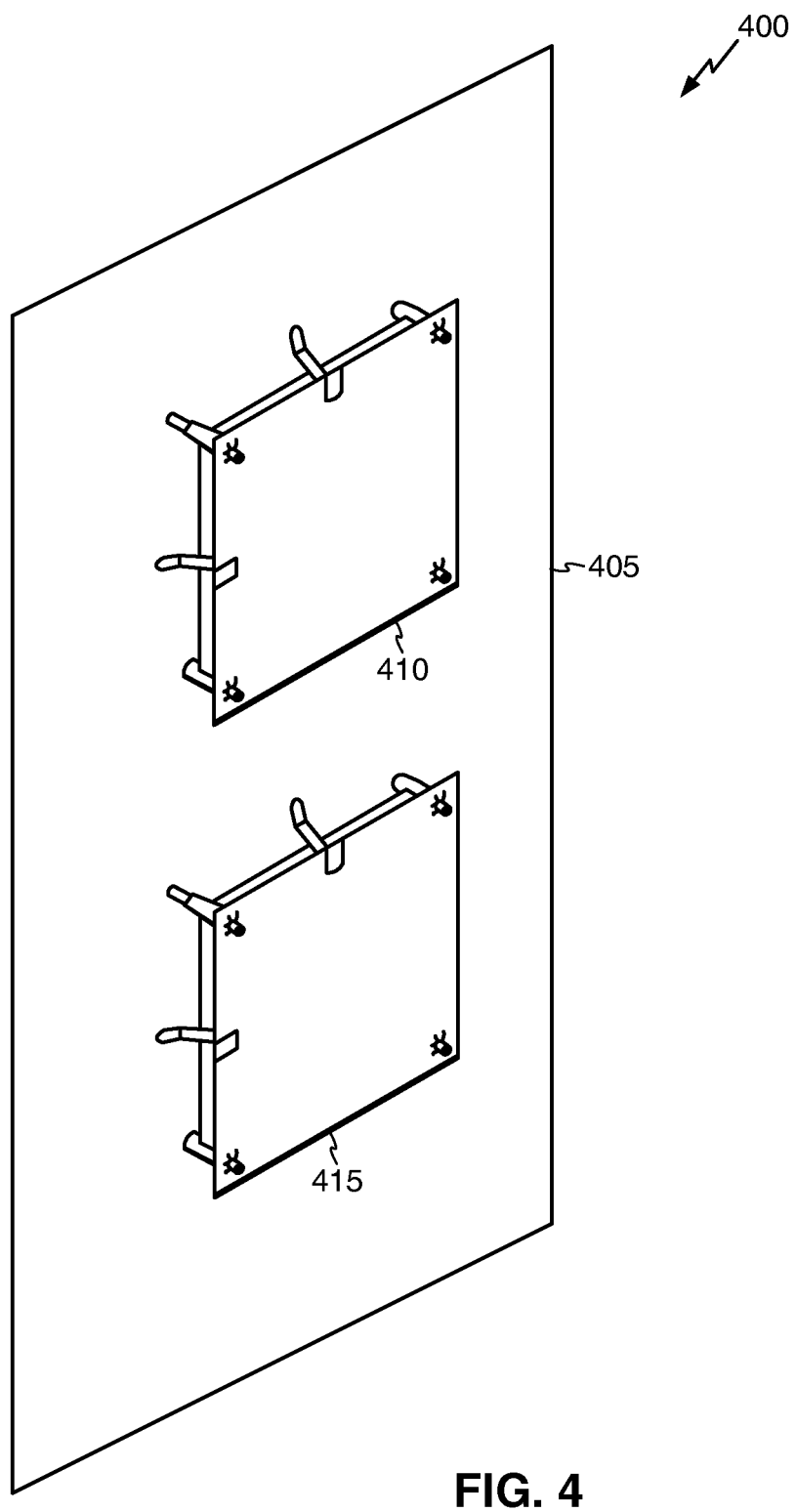
FIG. 4 is a block diagram of exemplary other repeater components in accordance with the herein described systems and methods.

FIG. 4 illustrates one side of another antenna configuration for use in providing selected isolation for an exemplary repeater. Antenna configuration 400 comprises PCB board 405 having one or more patch antennas 410 and 415 mounted thereto Note that typically there would be a like number of antenna patches on the opposite side of PCB and typically orientated in an opposite or advantageous polarization when compared to the polarization of antennas 410 and 415, such that a sufficient or even maximum amount of isolation is achieved between the antennas on opposite sides of the PCB. In an illustrative implementation, PCB board 405 can comprise one or more patch antennas 410 and 415 in various configurations and have more than one pair of patch antennas as well as an uneven number of respective patch antennas that make up a superset thereof. Antenna configuration 400 can with the deployment of patch antennas 410 and 415 along with a like number of antenna on the opposite side of the PCB provide selected isolation between a transmit and receive channel (e.g., transmit channels operatively coupled to one or more patch antennae and receive channels operatively coupled to one or more patch antennae) to cooperate with isolation and amplification provided by an exemplary cooperating feedback cancellation loop (e.g., feedback cancellation loop operatively coupled to an antenna array). The configuration of FIG. 4 shows another example of antenna arrays that can be used in embodiments described herein.

Figure 5:
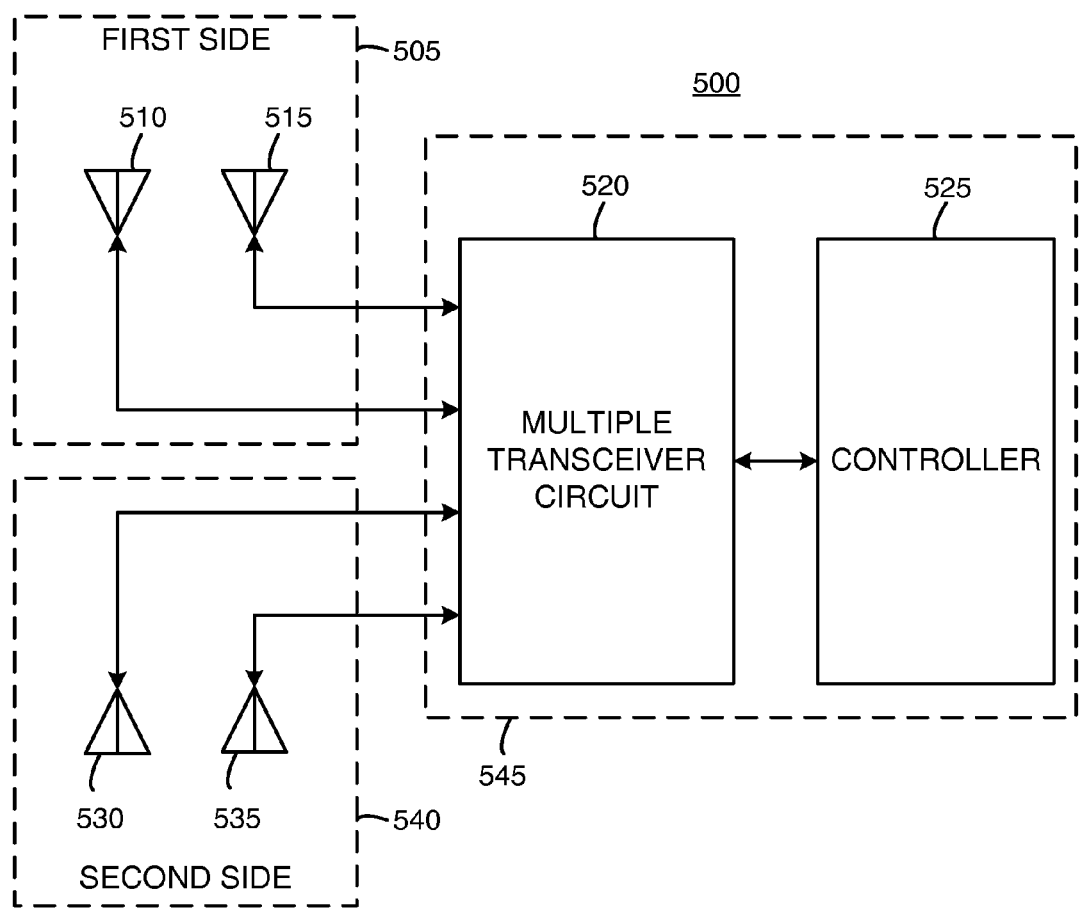
FIG. 5 is a block diagram of the cooperation of exemplary components of an illustrative RF repeater in accordance with the herein described systems and methods.

FIG. 5 shows exemplary repeater environment 500 operative to perform signal conditioning and amplification deploying an antenna array. Exemplary repeater environment 500 comprises a first antenna array 505 having antenna elements 510 and 515, second antenna array having antenna elements 530 and 535, processing circuitry 545 comprising multiple transceiver circuit 520 and controller 525. The antenna arrays 505 and 540 can cooperate with multiple transceiver circuit 520 which cooperates with controller 525 as part of operations of exemplary repeater environment 500. Signals can be received by antenna arrays 505 and 540 and passed to processing circuitry 545 for signal conditioning and processing and then passed back to antenna arrays 505 and 540 for communication with one or more cooperating components (e.g., base station of a CDMA wireless communications network).

Figure 13:
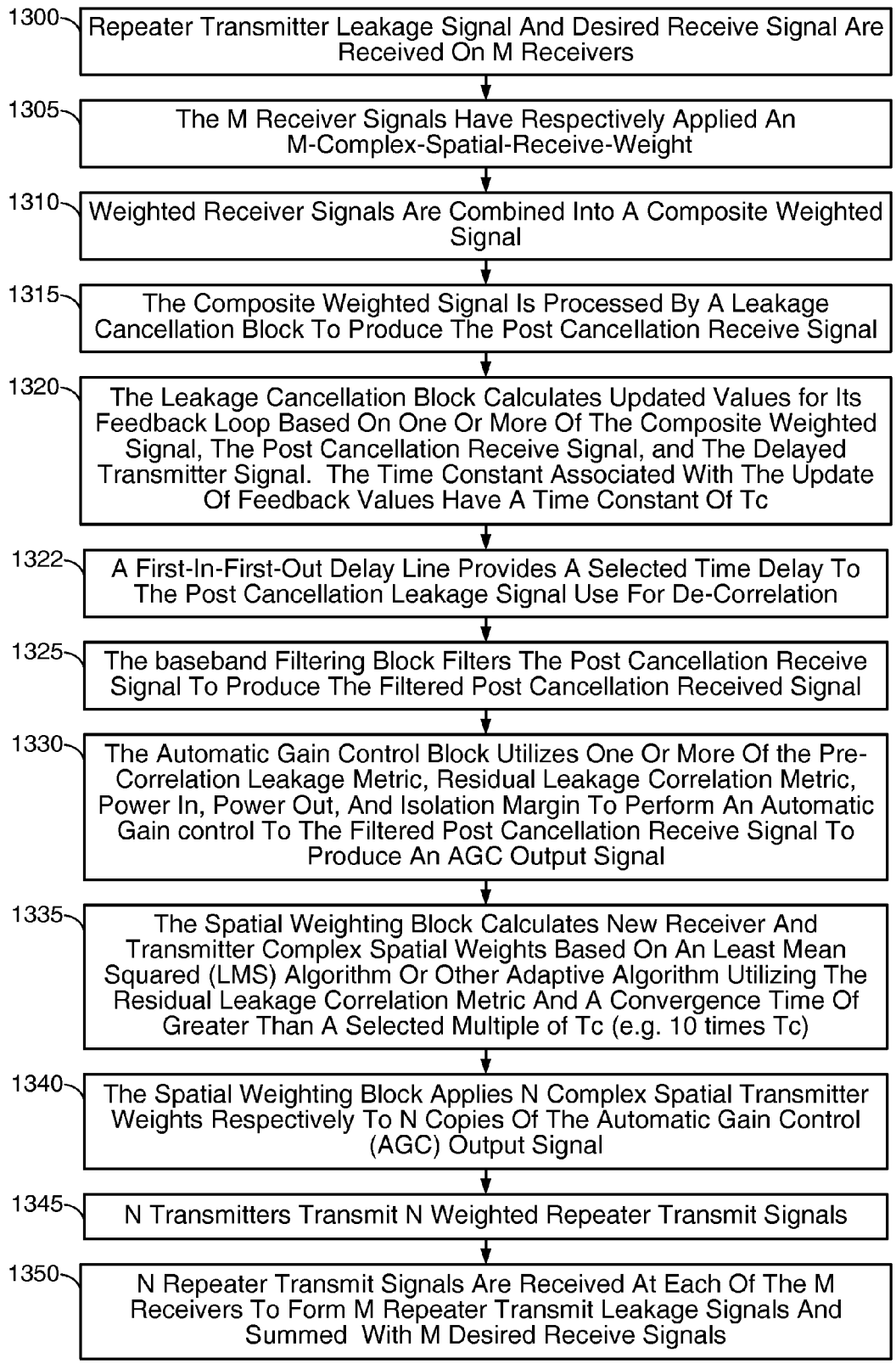
FIG. 13 is a flow diagram of one exemplary method for deploying metrics to improve signal integrity and amplification for a repeater.
Figure 14:
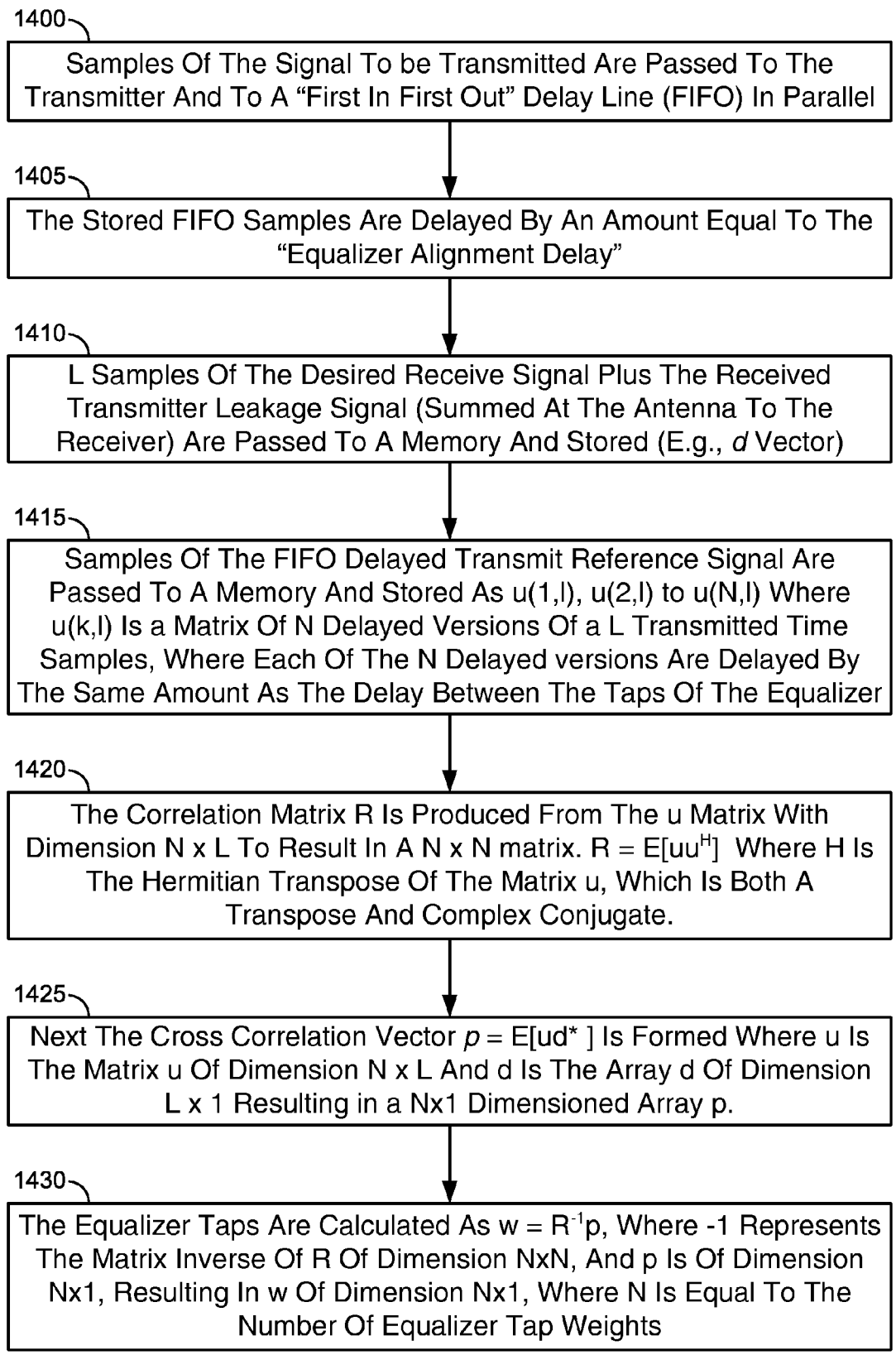
FIG. 14 is a flow diagram of one exemplary method for a closed form calculation of equalizer weights for use in signal cancellation.

In an illustrative implementation, antenna arrays 505 and 540 can comprise additional antenna elements as required to perform the method as described in (for example) FIGS. 13 and 14 to achieve adaptive feedback cancellation realized by cooperation of one or more antenna arrays and the application of correlated metric the weights for which are illustratively determined by a closed form calculation (e.g., MMSE). Further, it is appreciated that the number and configuration of the antenna arrays described herein are merely illustrative as the herein described systems and methods contemplate the use of varying number of antenna arrays having varying configurations and comprising varying number of antenna elements.

Figure 6:
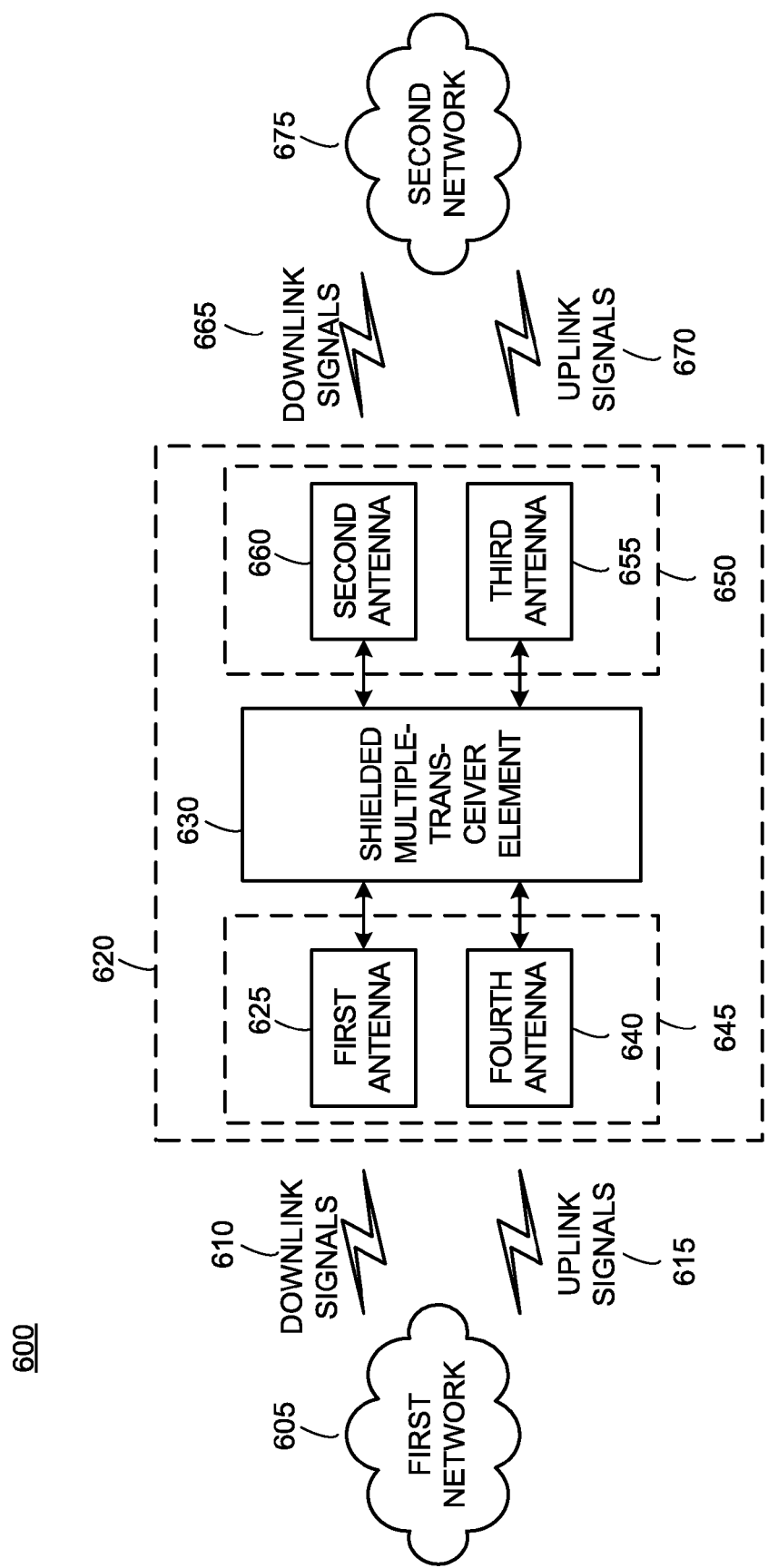
FIG. 6 is another block diagram of the cooperation of exemplary components of an illustrative RF repeater in accordance with the herein described systems and methods.

FIG. 6 illustrates interaction of exemplary repeater environment 600. Exemplary repeater environment 600 comprises processing circuitry 620 comprising antenna array 645 comprising first antenna 625 and fourth antenna 640, shielded multiple transceiver element 630, and antenna array 650 comprising second antenna element 660 and third antenna element 655. Operatively, downlink signals 610 originating from first network 605 can be processed by processing circuitry 620 to generate repeated downlink signals 665 for communication to second network 675, and uplink signals originating from second network 675 can be processed by processing circuitry 620 to generate repeated uplink signals 615 for communication to first network 605. Configuration and orientation of the antenna arrays 645 and 650 promote a selected isolation of unconditioned uplink and downlink signals provided to processing circuitry 620 and promote desired amplification and gain of such signals.

Exemplary repeater environment 600 can comprise additional antenna elements as required to perform methods as described in FIG. 13 and FIG. 14 to achieve cancellation realized by using a closed form calculation (e.g., MMSE) in calculating equalizer weights. Further, a number and configuration of the antenna arrays described herein are merely illustrative as the herein described systems and methods contemplate use of varying number of antenna arrays having varying configurations and comprising varying number of antenna elements.

Figure 7:
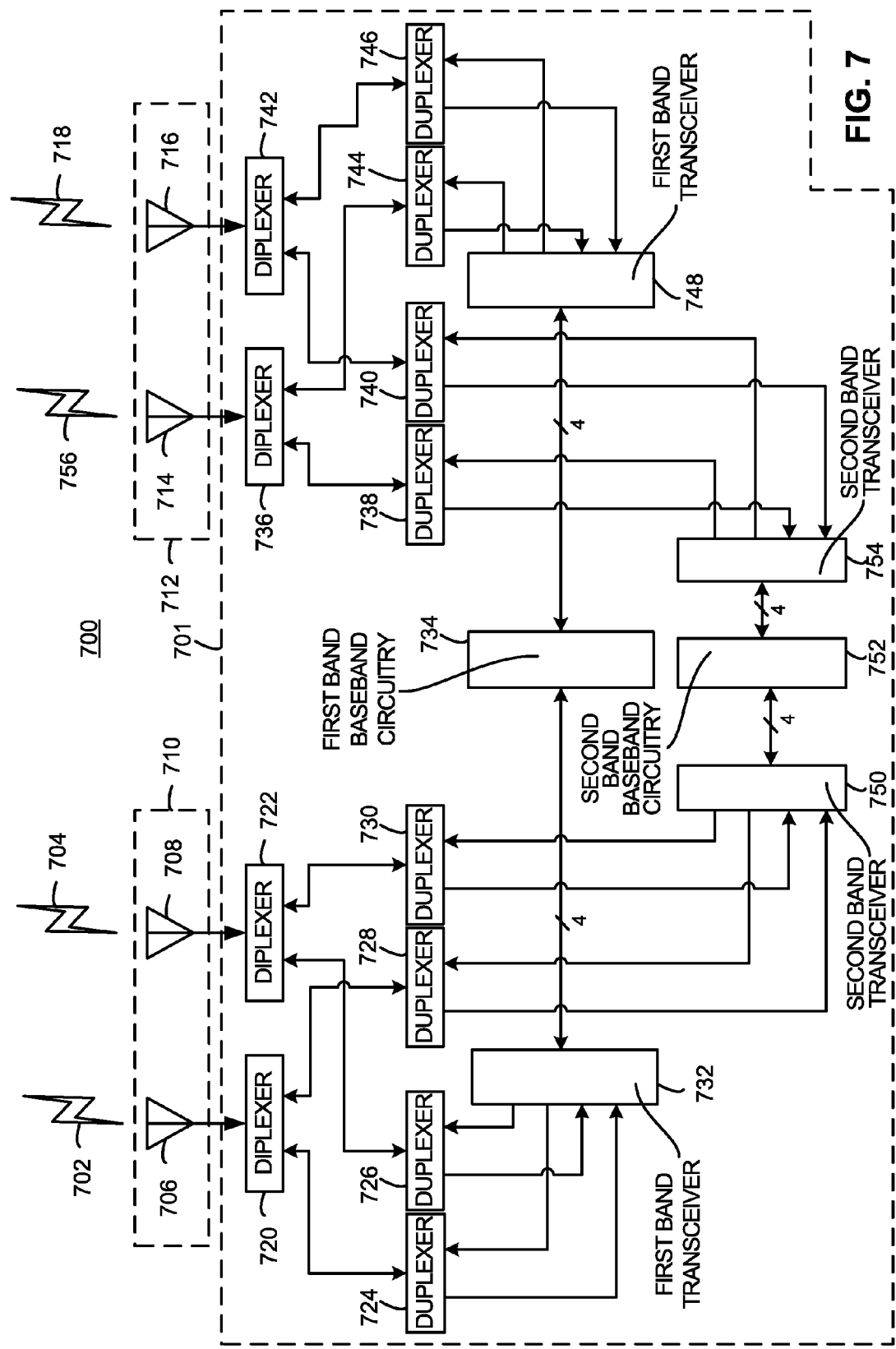
FIG. 7 is a block diagram of a frequency division duplexed (FDD) repeater having a dual band array in accordance with the herein described systems and methods.

FIG. 7 is a block diagram of a four-antenna, multiple-transceiver device 700 configured to operate in multiple bands in accordance with various illustrative implementations. This device 700 can transmit signals freely across two different bands using a variable configuration of the available antennae.

Device 700 can include a shielded multiple-transceiver element 701 having a first side 710 and a second side 712. The shielded multiple-transceiver element 701 includes first band transceivers 732 and 748, first band baseband circuitry 734, second band transceivers 750 and 754, second band baseband circuitry 752, duplexers 724, 726, 728, 730, 738, 740, 744, and 746; diplexers 720, 722, 736, and 742; first side 710 includes antennae 706 and 708; and second side 712 includes antennae 714 and 716. Although not shown in FIG. 7, the device 700 includes at least one electromagnetic isolation element, as described above, providing electromagnetic (EM) isolation between the antennae 706 and 708 on the first side 710, and the antennae 714 and 716 on the second side 712.

Illustratively, the antenna 706 can send or receive signals 702; the antenna 708 can send or receive signals 704; antenna 714 can send or receive signals 756; and antenna 716 can send or receive signals 718. These antennae 706, 708, 714, and 716 may be planar (e.g., patch) antennae, or any other desirable antenna types that may be effectively isolated from each other.

The first band transceiver 732 is connected to antennae 706 and 708 through duplexers 724, 726, 728, and 730, and diplexers 720, and 722 to send or receive data via antennae 706 and 708. First band transceiver 748 is connected to antennae 714 and 742 through duplexers 738, 740, 744, and 746, and diplexers 736, and 742 to send or receive data via antennae 714 and 716. First band baseband circuitry 734 is connected between first band transceiver 732 and first band transceiver 748 to provide communication between these two circuits.

Second band transceiver 750 is connected to antennae 706 and 708 through duplexers 728 and 730, and diplexers 720 and 722 to send or receive data via antennae 706 and 708. Second band transceiver 754 is connected to antennae 714 and 716 through duplexers 738 and 740, and diplexers 736 and 742 to send or receive data via antennae 714 and 716. Second band baseband circuitry 752 is connected between second band transceiver 750 and second band transceiver 754 to provide communication between these two circuits.

Diplexers 720, 722 are connected between antennae 706 and 708, and duplexers 724, 726, 728, and 730. They illustratively operate to determine which signals will be passed between antennae 706 and 708 and first band transceiver 732, and between antennae 706 and 708 and second band transceiver 750.

Diplexers 720, 722 are configured to split signals based on frequency, passing signals of a first frequency band to/from duplexers 724 and 726, and passing signals of a second frequency band to/from duplexers 728 and 730.

Duplexers 726, 728 are connected between diplexers 720, 722, and the first band transceiver 732; and duplexers 728, 730 are connected between diplexers 720, 722, and second band transceiver 750. These duplexers 724, 726, 728, 730 serve to route signals of slightly different frequencies within the first or second band, respectively, to properly direct transmitted or received signals between the first and second band transceivers 732 and 750 and the diplexers 720, 722.

Diplexers 738, 742 are connected between antennae 714 and 716, and duplexers 738, 740, 744, and 746. They illustratively operate to determine which signals will be passed between antennae 714 and 716 and first band transceiver 748, and between antennae 714 and 716 and second band transceiver 754.

Diplexers 738, 742 are configured to split signals based on frequency, passing signals of the second frequency band to/from duplexers 738 and 740, and passing signals of the first frequency band to/from duplexers 744 and 746.

Duplexers 738, 740 are connected between diplexers 736, 742, and the second band transceiver 754; and duplexers 744, 746 are connected between diplexers 736, 742, and first band transceiver 748. These duplexers 738, 740, 744, 746 serve to route signals of slightly different frequencies within the first or second band, respectively, to properly direct transmitted or received signals between first and second band transceivers 748 and 754 and diplexers 736, 742.

In alternate illustrative implementations some of duplexers 724, 726, 728, 730, 738, 740, 744, and 746, or diplexers 720, 722, 736, and 742 may be eliminated, since in some embodiments, certain permutations of band and antenna may be prohibited.

In other illustrative implementations signals from different bands may be specifically assigned to certain transmission orientations. In such embodiments, outputs of duplexers 724, 726, 728, 730, 738, 740, 744, and 746 can be directly connected to antennae 706, 708, 714, or 716. For example, the first band could be designated to always transmit/receive using a horizontal orientation, and the second band could be designated to always transmit/receive using a vertical orientation.

Although the above illustrative implementations show use of only two or four antennae, along with two transceivers, this is by way of example only. Multiple-antennae, multiple-transceiver devices using different numbers of antennae or transceivers can also be used.

Furthermore, although the above illustrative implementations show antennae that are separate from a PCB, alternate embodiments could form at least some of the antennae directly on the opposite sides of the PCB. In such embodiments insulating layers within the PCB can form the required non-conductive support members to separate the antennae from the ground plane. Also, in such embodiments the transceiver will likely be formed off of the PCB, and connected to the antennae by wiring on the PCB. This sort of integrated structure can provide for a more compact device.

Figure 8:
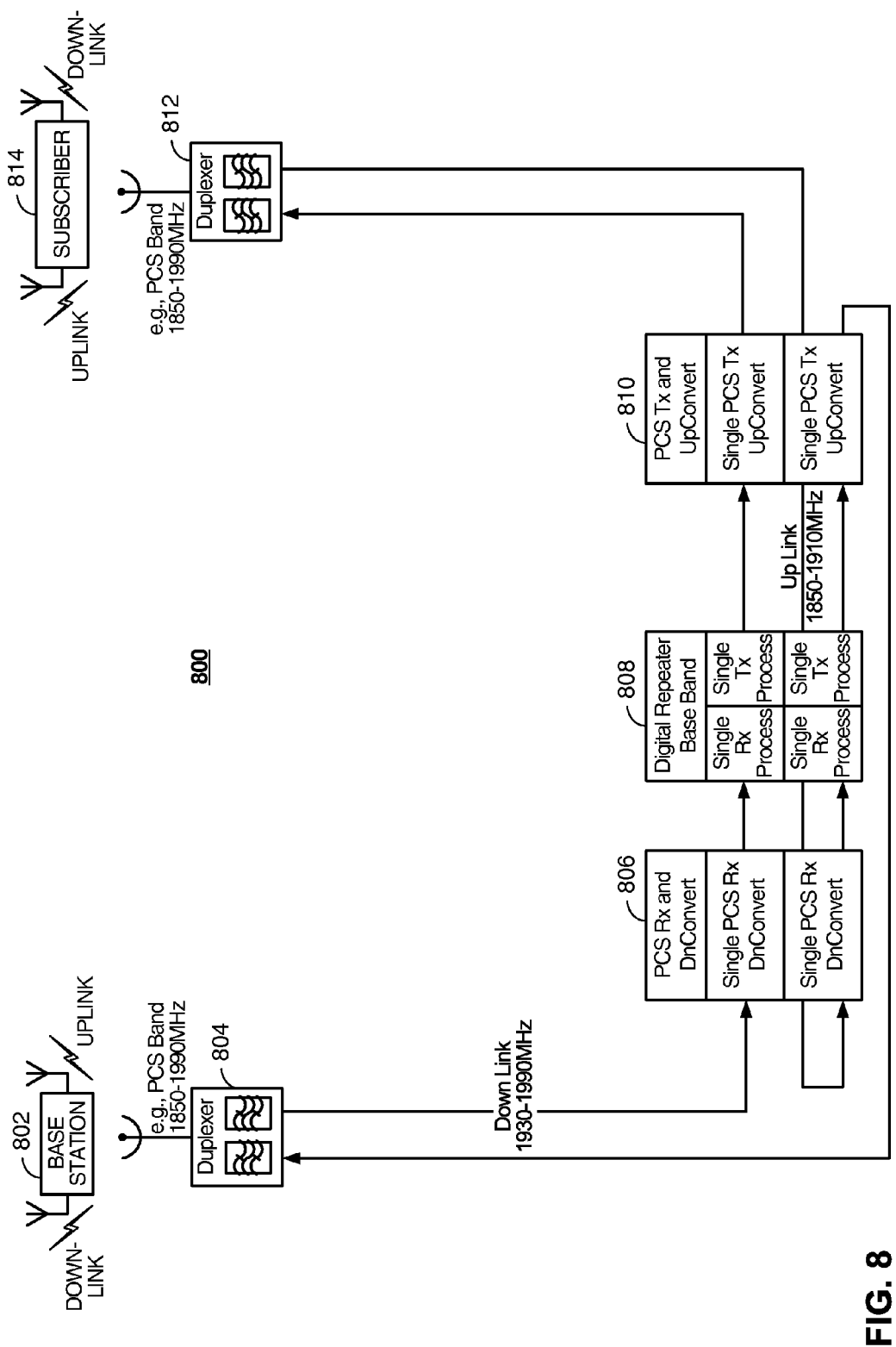
FIG. 8 is a block diagram of an exemplary FDD single band repeater having a digital interference cancellation system in accordance with the herein described systems and methods.

FIG. 8 depicts exemplary repeater environment 800 operative to deploy an FDD single band with digital interference cancellation system in accordance with performing the exemplary methods described herein. As is shown, exemplary repeater environment 800 comprises duplexer 804 operatively coupled to an antenna element operative to receive signals from base station 802 and providing input signals to transceiver 806 and is operative to receive signals for processing from transceiver 8066. Further, exemplary repeater environment comprises digital repeater baseband component 808 operatively coupled to transceiver 806 and transceiver 810 which is operatively coupled to duplexer 812. In an illustrative implementation, duplexer is operatively coupled to an antenna element that allows for the communication of signals to a cooperating subscriber component 814 (e.g., mobile handset).

In an illustrative operation, as shown by arrowed lines, received and transmitted signals can be processed by exemplary repeater environment 800 such that exemplary feedback cancellation methods as described herein can be implemented.

Figure 9:
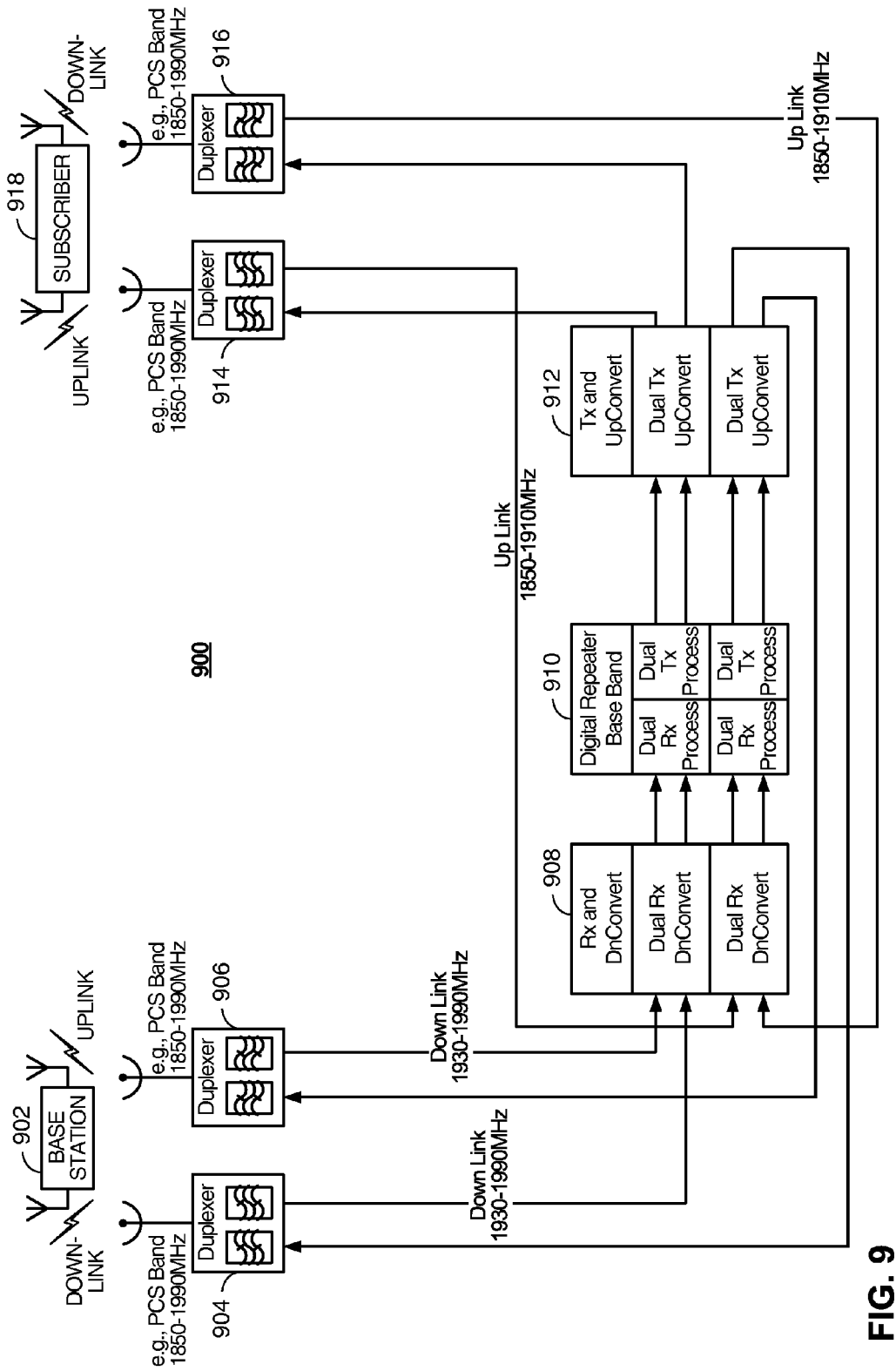
FIG. 9 is a block diagram of an exemplary FDD single band repeaters having a digital interference cancellation system and array in accordance with the herein described systems and methods.

FIG. 9 shows exemplary repeater environment 900 operative to deploy an FDD single band with digital interference and an antenna array in accordance with the performing exemplary methods described herein. As is shown, exemplary repeater environment 900 comprises duplexers 904, 906, 914, and 916; transceivers 908 and 912; and digital repeater base band 910. Duplexers 904, 906, 914, and 916 can be operatively coupled to one or more antenna elements which can receive/transmit signals from base station 902 and subscriber component 918.

In an illustrative operation, as shown by arrowed lines, incident and transmitted signals can be processed by exemplary repeater environment 900 according to the exemplary feedback cancellation methods as described herein.

Figure 10:
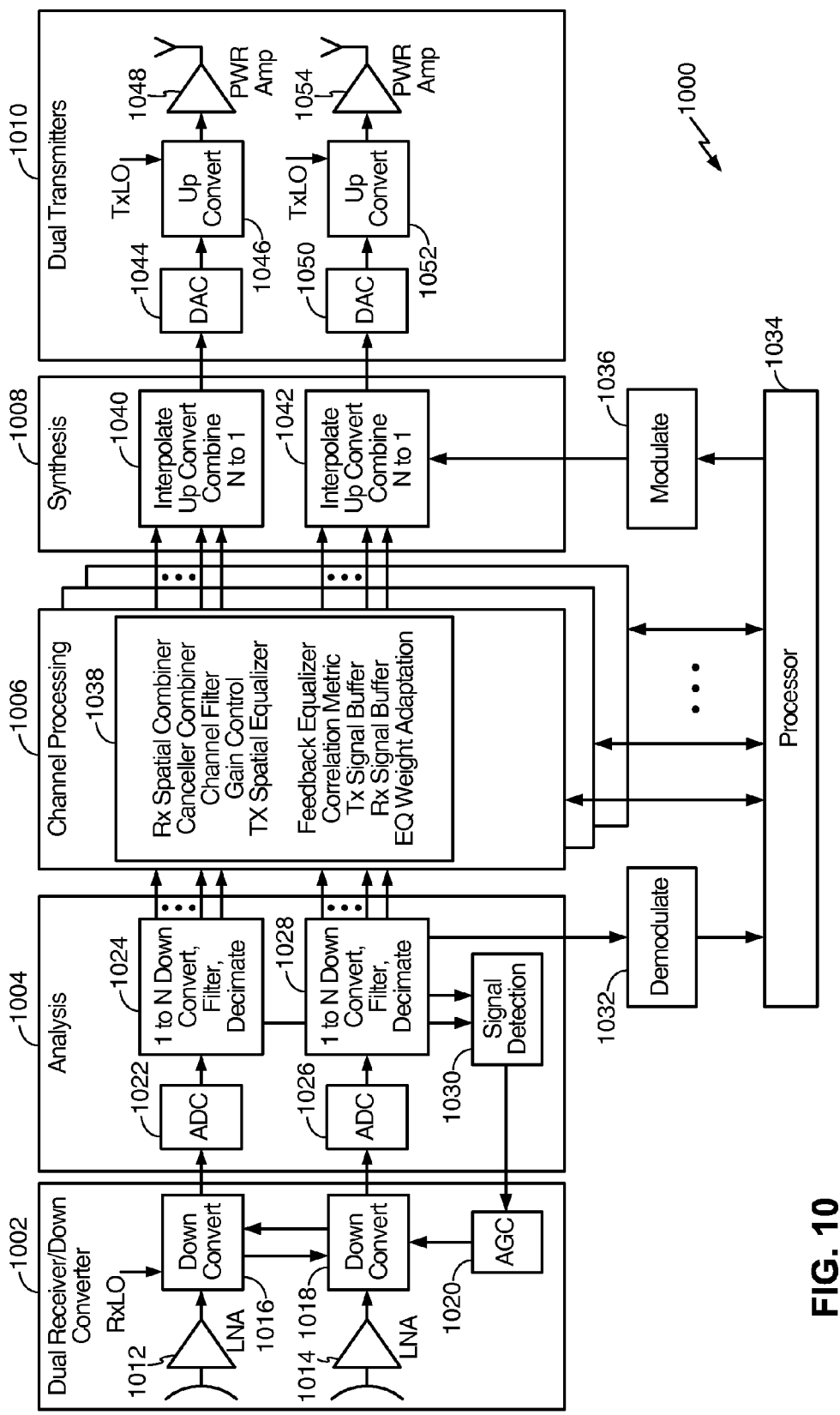
FIG. 10 is a block diagram showing the interaction of exemplary components having feedback cancellation and metric application mechanisms in accordance with the herein described systems and methods.

FIG. 10 is a block diagram depicting interaction of exemplary components of an illustrative repeater environment 1000 operative to perform exemplary methods as described herein. As is shown, FIG. 10 depicts an illustrative implementation of an exemplary repeater environment 1000 deploying weighting calculations and applying metrics as part of a feedback loop cancellation technique. Exemplary repeater environment 1000 comprises dual receiver down converter module 1002, analysis modules 1004, one or more channel processing modules 1006, synthesis module 1008, dual transmitters 1010, demodulate module 1032, processor 1034, and modulate module 1036. Further, dual receiver/down converter module 1002 comprises antenna elements 1012 and 1014, down converters 1016, and 1018, and automatic gain control module 1020. Analysis modules 1004 further comprises analog to digital converters 1022 and 1026, signal detection module 1030, and 1 to N down convert, filter, decimate modules 1024 and 1028. One or more channel processing modules 1006 can comprise inter-operative portions 1038 receive spatial combiner, canceller combiner, channel filter, gain control, transmit spatial equalizer, feedback equalizer, correlation metric, transmission buffer, receive signal buffer, and equalizer weight adaption. Synthesis module 1008 comprises interpolate up convert combine N to 1 modules 1040 and 1042. Dual transmitters modules 1010 comprise digital to analog converters 1044 and 1050, up converters 1046 and 1052, power amplifier 1048 and 1054 cooperating with one or more antenna elements.

In an illustrative operation, signals can be received from a cooperative communications network (e.g., CDMA, GSM, GPRS, WiMax communications network) by dual receiver/down converter module 1002 where the received signals are illustratively processed by down converters 1016 and 1018 as part of a selected signal conditioning technique. The down converted signals can then be converted from analog signals to digital signals by analog-to-digital converters 1022 and 1026. The resulting digital signals can be further filtered for demodulation by 1 to N down convert, filter, decimate modules 1024 and 1028. The filtered signals can then be demodulated by demodulate module 1032 and communicated to processor 1034 for further signal processing. Further, as part of the illustrative implementation, during analysis module operations, signals can be communicated by 1 to N down convert, filter, decimate module 1028 and 1024 to signal detection module 1030 where the control signal can be passed to automatic gain control module 1020 as part of a feedback loop. Output of the automatic gain control module 1020 can act as input to the down convert components 1016 and 1018.

In the illustrative operation, the outputs of the 1 to N down convert, filter, decimate components 1024 and 1028 along with instructions from processed data from processor 1034 can act as input to one or more channel processing modules 1038. In the illustrative operation, the one or more channel processing modules 1038 can perform various signal processing and conditioning operations including correlation metrics, feedback equalization, gain control and channel filtering. Output of the one or more channel processing modules 1038 are communicated to synthesis module 1008 where the signals are interpolated, up converted and combines N to 1 along with a modulated signal from modulator 1036. The synthesized signals are then sent to dual transmitters module 1010 where digital to analog converters 1044 and 1050 convert the processed/conditioned digital signals to an analog signal for up converting by up convert components 1046 and 1052 for transmission through power amplifiers and antenna elements 1044 and 1048.

Figure 11:
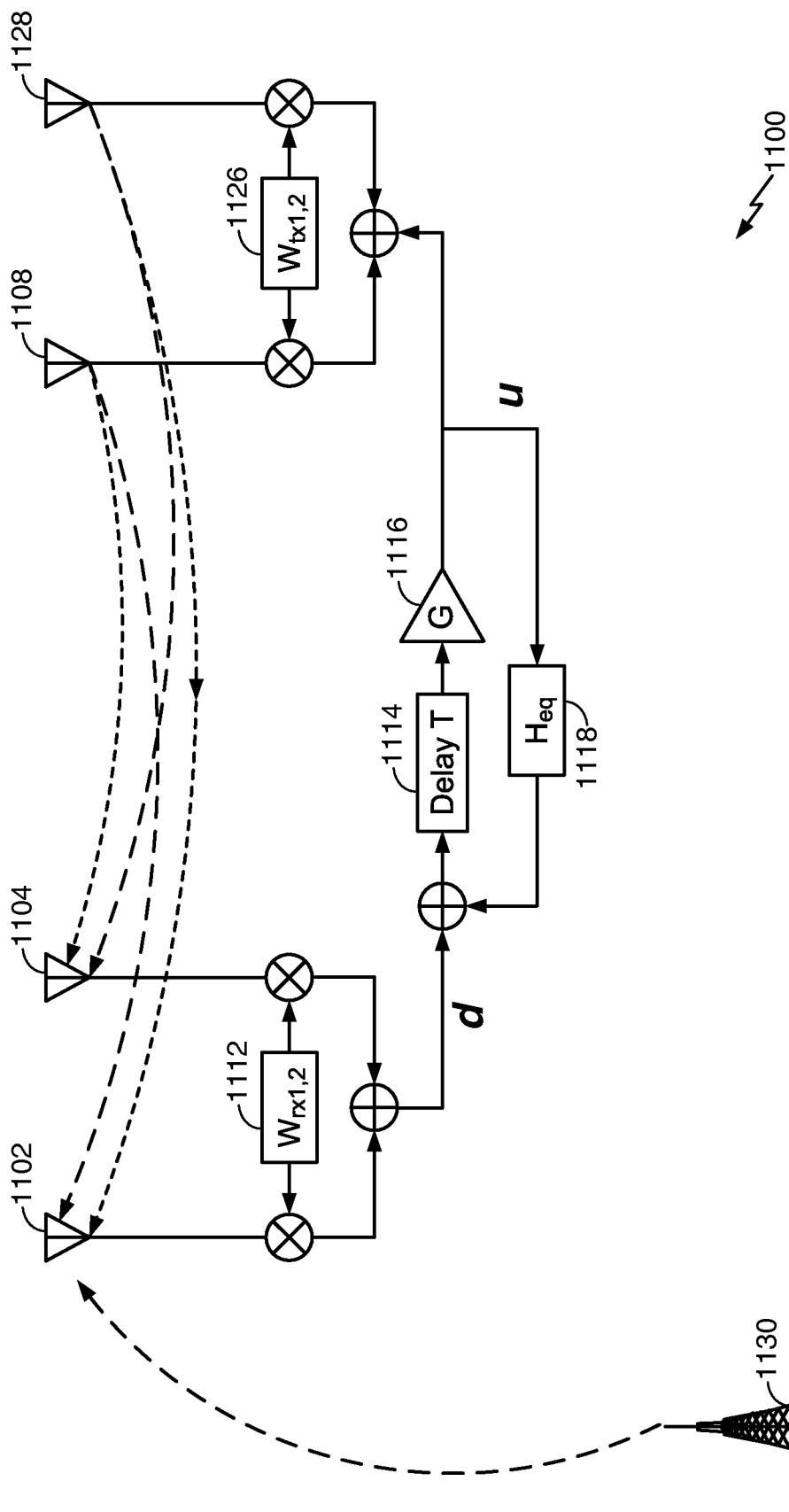
FIG. 11 is a block diagram showing the application of weights for use in conjunction with the application of a selected one or metrics in accordance with the herein described systems and methods.

FIG. 11 is a block diagram showing the interaction of exemplary components and exemplary signal pathways to perform the exemplary methods as described in FIG. 13 and FIG. 14 as performed by exemplary repeater environment 1100. As is shown, exemplary repeater environment comprise antenna elements 1102, 1104, 1108, and 1128 (e.g., antenna array), adaptive antenna weight block 1112, delay block T 1114, gain block 1116, channel equalizer 1118, delay block T 1124, filter 1122, processor 1120, and adaptive antenna weight block 1126.

In an illustrative operation, a signal incident (e.g., receive signal) on antenna array 1102 and 1104 provided by exemplary base station 1130 can be processed by adaptive antenna weight block 1112 to apply weights to the receive signal to generate a composite signal that acts as input, along with the output of channel equalizer 1118 to delay T block 1114. Operatively, delay T block 1114 introduces a selected time delay prior to conditioning the signal by gain block 1116 (e.g. automatic gain control operations). This delay is sufficient to ensure that the total delay of the repeater is sufficient to de-correlate the transmitter leakage signal received at the receiver from the concurrently received desired receive signal. The output of gain block 1116 operatively acts as input to a number of cooperating blocks comprising channel equalizer 1118, delay T block 1124, and as output to be summed by adaptive antenna weight block 1326. Operatively delay T block provides a time delay to a complex multiplier which additionally receives input from the gain block 1116. The complex multiplier acts output acts as input to filter 1122 whose output acts as input to processor 1120. Operatively processor 1120 can perform on or more selected weight control operations. Illustratively, the channel equalizer 1118 can provide input to an addition component which adds the output of the channel equalizer 1118 with a weighted composite received signal to act as input to delay T block 1114. Further as is shown by the dashed arrowed lines (e.g., propagation paths) conditioned transmit signals can be received at receiver antenna array 1102 and 1104 as part of performing the exemplary methods as described in FIG. 13 and FIG. 14.

Figure 12:
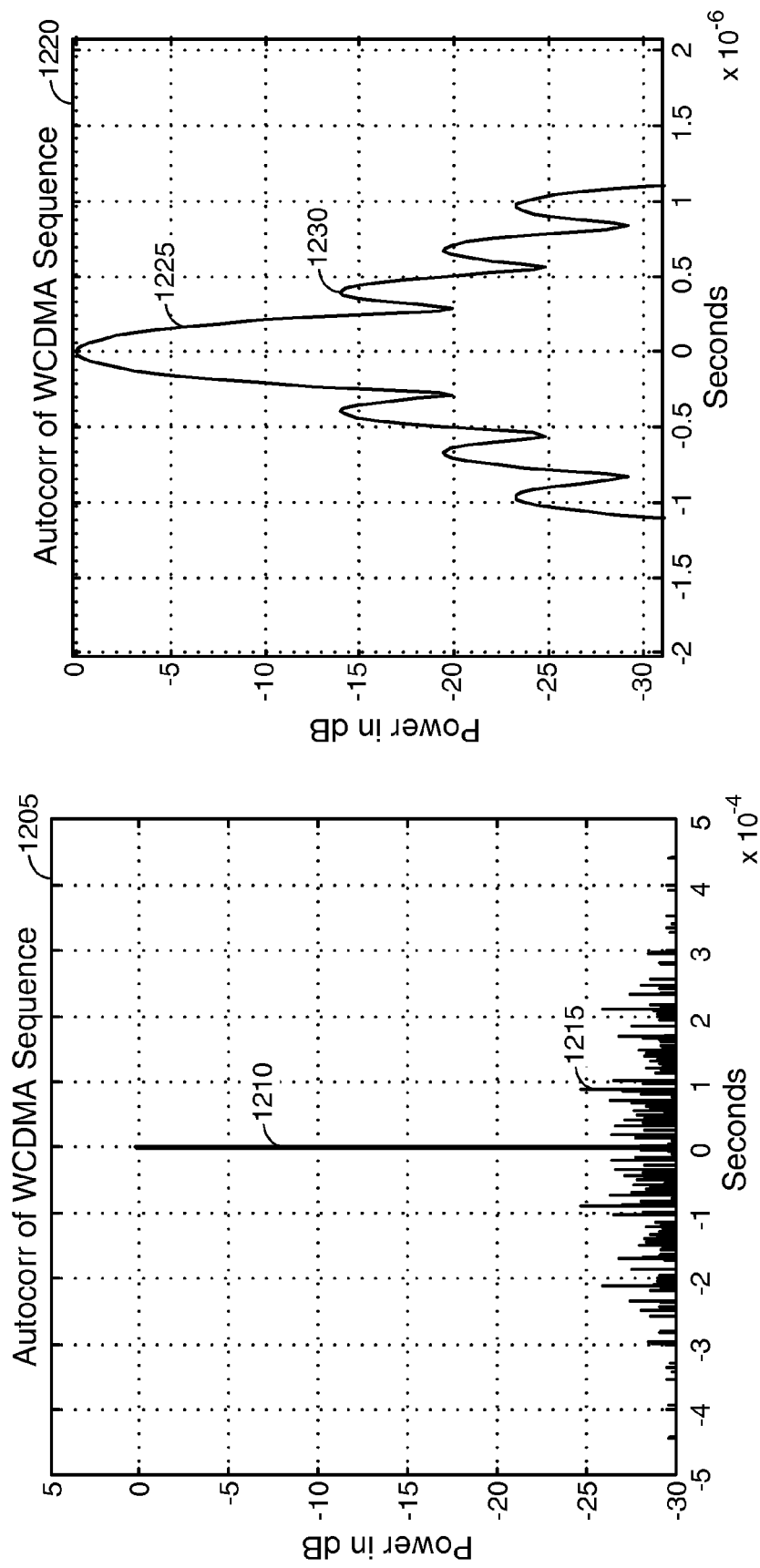
FIG. 12 is a graph diagram showing the impact of exemplary deployed feedback cancellation and metric application mechanisms in accordance with the herein described systems and methods.

FIG. 12 is graphical diagram showing exemplary graph plots 1205 and 1220 describing results show the autocorrelation of a WCDMA signal at different time scales. As can be seen in Graph plot 1205, when the time delay between the WCDMA signal and itself is zero, the correlation occurs to a high degree as shown at point 1410. In this case, the plot is normalized such that the maximum correlation is placed at 0 dBm and occurs at value 1210. At different time delays between the signal and itself the correlation is reduced dramatically as can be see at point 1215. Graph plot 1220 is a zoomed in version of the previous graph plot 1205. The increments in time on the X axis are microseconds. Illustratively, for a WCDMA signal with a bandwidth of 3.84 MHz, a time delay equal to the inverse of this bandwidth can be required to de-correlate the signal with itself. This can be seen at the first null between point 1225 and 1230. Providing a delay in the repeater in excess of the inverse of the bandwidth of the signal being repeated will generally provide for this de-correlation effect and allow the correlation metric to operate effectively. Further, ensuring time alignment of the receiver transmitter leakage signal with the cancellation signal produced by the feedback cancellation equalizer in the cancellation block allows proper cancellation and calculation of cancellation weighting, with no average effect on the desired receiver signal due to misalignment.

FIG. 13 is a flow diagram of an exemplary method performed by an exemplary repeater environment deploying a feedback cancellation loop adaptively coupled to an antenna array having an applied metric to improve isolation. As is shown, processing begins at 1300 where a repeater transmitter leakage signal and desired received signal are received on M number of receivers. From there processing proceeds to 1305 where the M receiver signals have respectively applied to them an M-complex-spatial-receive weight. From there, processing proceeds to 1310 where the weighted receiver signals are combined into a composite weighted signal. The composite weighted signal is processed by a leakage cancellation block to produce a post cancellation receive signal at 1315. At 1320, the leakage cancellation block calculates updated values for its feedback loop based on one or more of the composite weighted signal, the post cancellation receive signal, and the delayed transmitter signal. In an illustrative implementation, the exemplary weights can be generated by using a closed form calculation (e.g., MMSE) as described in FIG. 14. In an illustrative implementation, the time constant associated with the update of feedback values can be considered to have a time constant Tc. A first-in-first-out (FIFO) delay line can then provide a selected time delay to the post cancellation leakage signal for use in de-correlating the transmit leakage signal from the receive signal at 1322. Illustratively, the FIFO delay can be alternatively provided as a composite delay derived from the operation of an exemplary feedback cancellation loop cooperating with one or more a cooperating repeater components comprising a filter component, an automatic gain control component, and other components providing beneficial operations in the repeating process such that the processing performed by one or more of these components as summed up provides sufficient time delay such that upon retransmission of the signal a delay ensures de-correlation between the transmitter leakage signal and the receive signal in the desired antenna elements. Generally, this composite delay is a multiple of the inverse of the bandwidth of the signals being repeated.

The baseband filtering block filters the post cancellation receive signal to produce a filtered post cancellation received signal at 1325. At 1330, the automatic gain control block utilized one or more of the pre-correlation leakage metric, residual leakage correlation metric, power in, power out, and isolation margin to perform an automatic gain control to the filtered post cancellation receive signal to produce an automatic gain control output signal. Processing then proceeds to 1340 where a spatial weighting block applies N complex spatial transmitter weights respectively to N copies of the automatic gain control (ACG) output signal. The N weighted repeater transmit signals are then transmitted by the N transmitters to at 1345 and are received at each of the M receivers at 1350 to form M repeater transmit leakage signals and are summed with the M desired receive signals to provide feedback cancellation operations.

FIG. 14 is a block diagram of exemplary processing performed in a closed form calculation of equalizer weights for use in a feedback cancellation loop. As is shown, processing begins at 1400 where samples of the signal to be transmitted are passed to the transmitter and to a "First In First Out" (FIFO) delay line in parallel. Processing then proceeds to 1405 where the stored FIFO samples are delayed by an amount equal to the "Equalizer Alignment Delay". Illustratively, "Equalizer Alignment Delay" can be considered to be the total delay from the FIFO input location through transmission processing, Digital to Analog Conversion, over the air propagation, Analog to Digital Conversion, and receive processing to the input to the canceller minus the feedback canceller's equalizer sample delay. Processing then proceeds to 1410 where L number of samples of the desired receive signal plus the received transmitter leakage signal (e.g., summed at the antenna to the receiver) are passed to a memory and stored (e.g., the d vector). From there processing proceeds to 1415, where samples of the FIFO delayed transmit reference signal are passed to a memory and stored as $u(1,1), u(2,1)$ to $u(N,1)$ where $u(k,1)$ is a matrix of N delayed versions of a L transmitted time samples, where each of the N delayed versions are delayed by the same amount as the delay between the taps of the equalizer. Processing then proceeds to 1420 where the correlation matrix R is produced from the u matrix with dimension N×L to result in a N×N matrix. $R=E[uu^H]$ where H is the Hermitian transpose of the matrix u, which is both a transpose and complex conjugate. From there, processing proceeds to 1425 where the cross correlation vector $p=E[ud^*]$ is formed where u is the matrix u of dimension N×L and d is the array d of dimension L×1 resulting in a N×1 dimensioned array p. The equalizer tap weights are calculated at 1430 illustratively represented by $w=R^{-1}p$, where −1 represents the matrix inverse of R of dimension N×N, and p is of dimension N×1, resulting in w of dimension N×1, where N is equal to the number of equalizer tap weights.

It is appreciated that although the processing of FIG. 14 is described for a N tap equalizer that N can equal one such that the calculations performed by the method of FIG. 14 are simplified to the use of a single value instead of the use of matrix associated calculations.

The systems and methods for efficiently representing knowledge of the herein described systems and methods may also be applied to the context of resolving in memory data on the same provider. In such context, the in memory data may not be backed by a physical store, e.g., it might be used in a graph solver on the CPU to synchronize nodes. The herein described systems and methods may also be applied in the context of scene graphs, especially as they become more distributed on multi-core architectures and calculations are written directly to an in memory data structure such as a volumetric texture.

There are multiple ways of implementing the present herein described systems and methods, e.g., an appropriate API, tool kit, driver code, operating system, control, standalone or downloadable software object, etc. which enables applications and services to use the systems and methods for representing and exchanging knowledge in accordance with the herein described systems and methods. The herein described systems and methods contemplate the use of the herein described systems and methods from the standpoint of an API (or other software object), as well as from a software or hardware object that performs the knowledge exchange in accordance with the herein described systems and methods. Thus, various implementations of the herein described systems and methods may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned above, while exemplary embodiments of the herein described systems and methods have been described in connection with various computing devices and network architectures, the underlying concepts may be applied to any computing device or system in which it is desirable to synchronize data with another computing device or system. For instance, the synchronization processes of the herein described systems and methods may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the methods and apparatus of the herein described systems and methods, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the herein described systems and methods. In the case of program code execution on programmable computers, the computing device generally includes a processor, a storage medium readable by the processor (including volatile and non-volatile memory and/or storage elements), at least one input device, and at least one output device. One or more programs that may implement or utilize the synchronization services and/or processes of the herein described systems and methods, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the herein described systems and methods may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the herein described systems and methods. When implemented on a general-purpose processor, the program code combines with the processor to provide a unique apparatus that operates to invoke the functionality of the herein described systems and methods. Additionally, any storage techniques used in connection with the herein described systems and methods may invariably be a combination of hardware and software.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") where used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of FIG. 6. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

While the herein described systems and methods has been described in connection with the preferred embodiments of the various figures, it is to be understood that other similar embodiments may be used or modifications and additions may be made to the described embodiment for performing the same function of the herein described systems and methods without deviating therefrom. For example, while exemplary network environments of the herein described systems and methods are described in the context of a networked environment, such as a peer to peer networked environment, one skilled in the art will recognize that the herein described systems and methods are not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the herein described systems and methods in the context of particular programming language constructs, the herein described systems and methods are not so limited, but rather may be implemented in any language to provide methods for representing and exchanging knowledge for a set of nodes in accordance with the herein described systems and methods. Still further, the herein described systems and methods may be implemented in or across a plurality of processing chips or devices, and storage may similarly be effected across a plurality of devices. Therefore, the herein described systems and methods should not be limited to any single embodiment, but rather should be construed in breadth and scope in accordance with the appended claims.

What is claimed is:

1. A repeater for a wireless communication network, the repeater operative to provide feedback cancellation, the repeater comprising:
    a calculation module configured to perform closed form calculations for equalizer weights, wherein samples of a transmitter and/or receiver signal are stored as part of the closed form calculations;
    an equalized feedback cancellation loop comprising an equalizer cooperating with the calculation model to generate at least the equalizer weights for use in one or more operations to provide signal cancellation and isolation; and
    a forward signal path coupled to the equalized feedback cancellation loop, the forward signal path comprising a delay block and gain block, wherein the delay block delays a desired receive signal an amount of time sufficient to de-correlate the desired receive signal from a transmitter leakage signal.

2. The repeater as recited in claim 1, wherein the equalizer includes N taps, wherein N is greater than or equal to one, and wherein the equalizer weights comprise equalizer tap weights.

3. The repeater as recited in claim 1, wherein the closed form calculations comprise minimum mean squared error (MMSE) calculations.

4. The repeater as recited in claim 1, further comprising one or more analog to digital converters operative to sample an input signal to the repeater.

5. The repeater as recited in claim 4, further comprising a digital to analog converter operative to modulate a signal provided by the equalized feedback cancellation loop into an RF signal.

6. The repeater as recited in claim 1, wherein the repeater is a Time Division Duplex repeater and the wireless communication network is one of a Wireless-Fidelity (Wi-Fi), and Worldwide Interoperability for Microwave Access (Wi-max) network.

7. The repeater as recited in claim 1, wherein the repeater is a Frequency Division Duplex repeater and the wireless communication network is one of a cellular, Global System for Mobile communications (GSM), Code Division Multiple Access (CDMA), and ThirdGeneration (3G) network.

8. The repeater as recited in claim 1, further comprising one or more reception and/or transmission antennas, wherein the reception and/or transmission antennas including one or more dipole antennas, one or more patch antennas, or a combination thereof.

9. The repeater as recited in claim 1, wherein the calculation module comprises digital logic to manage, control, monitor, and direct the calculation of the equalizer weights.

10. The repeater as recited in claim 1, wherein the calculation module is configured to perform the closed form calculations by executing a linear algebra algorithm comprising at least one algorithm selected from the group consisting of a minimum mean squared error (MMSE) algorithm, a maximum signal-to-noise ratio algorithm, and a linear constrained minimum variance algorithm.

11. A method to facilitate feedback loop cancellation in a digital repeater environment comprising:
    storing a receive signal from a receiver;
    processing the receive signal to produce a signal to be transmitted;

passing samples of the signal to be transmitted to a transmitter and a first-in-first-out (FIFO) delay line in parallel;
adding a selected time delay to the samples passed to the FIFO delay line by an amount equal to a total delay from a FIFO input location through transmission processing minus an amount equal to a feedback cancellation loop's equalizer sample delay to generate FIFO delayed transmit reference signal;
passing samples of the FIFO delayed transmit reference signal to a memory as a selected matrix u;
generating a correlation matrix R from the stored samples of the FIFO delayed transmit reference signal;
generating a cross correlation array p derived from correlating the delayed transmitter reference signal with receive signal resulting in an array p having a selected dimension; and
calculating equalizer tap weights using the inverse of R matrix and the array p.

12. The method as recited in claim 11, further comprising storing the FIFO delayed transmit reference signal are stored in memory.

13. The method as recited in claim 12, further comprising an equalizer having N taps where N is greater than or equal to one.

14. The method as recited in claim 13, further comprising providing an adaptive antenna array for cooperation with the equalizer to generate a correlation metric.

15. The method as recited in claim 11, further comprising transmitting the equalizer tap weights from the equalizer to a receiver of the repeater.

16. The method as recited in claim 11, further comprising storing the FIFO delayed transmit signal as u(1,1) to u(N,1), wherein u(k,1) be represented as matrix of N delayed versions of a L transmitted time samples, wherein each of the N delayed versions are delayed by the same amount as the delay between the taps of an equalizer.

17. The method as recited in claim 16, further comprising producing correlation matrix R from the u matrix wherein the u matrix has a dimension N×L and is processed according to a Hermitian transpose to result in an N×N matrix.

18. The method as recited in claim 11, further comprising calculating the equalizer tap weights according to one or more closed form linear algebra algorithms comprising MMSE, MaxSNR, and LCMZV algorithms.

19. The method as recited in claim 18, further comprising utilizing the closed form linear algebra algorithm in conjunction with a leakage correlation metric.

20. The method as recited in claim 18, further comprising utilizing the closed form linear algebra algorithm in conjunction with an adaptive algorithm.

21. A non-transitory computer readable medium having stored thereon computer executable instructions for performing the following acts:
passing samples of the signal to be transmitted to a transmitter and a first-in-first-out (FIFO) delay line in parallel;
adding a selected time delay to the FIFO samples by an amount equal to the total delay from the FIFO input location through transmission processing minus an amount equal to a feedback cancellation loop's equalizer sample delay to generate FIFO delayed transmit reference signal;
passing samples of the FIFO delayed transmit reference signal to a memory as a selected matrix u;
generating a correlation matrix R from the stored FIFO delayed transmit reference signal samples;
generating a cross correlation vector p derived in part from the stored FIFO delayed transmit signal samples resulting in an array p having a selected dimension; and
calculating equalizer tap weights using the inverse of R matrix and the array p.

22. A processor comprising a memory having stored thereon computer executable instructions that cause the processor to perform the following acts:
passing samples of the signal to be transmitted to a transmitter and a first-in-first-out (FIFO) delay line in parallel;
adding a selected time delay to the FIFO samples by an amount equal to the total delay from the FIFO input location through transmission processing minus an amount equal to a feedback cancellation loop's equalizer sample delay to generate FIFO delayed transmit reference signal;
passing samples of the FIFO delayed transmit reference signal to the memory as a selected matrix u;
generating a correlation matrix R from the stored FIFO delayed transmit reference signal samples;
generating a cross correlation vector p derived in part from the stored transmit signal resulting in an array p having a selected dimension; and
calculating equalizer tap weights using the inverse of R matrix and the array p.

* * * * *